US008719620B2

(12) United States Patent
Seki

(10) Patent No.: US 8,719,620 B2
(45) Date of Patent: May 6, 2014

(54) STORAGE CONTROL APPARATUS AND STORAGE CONTROL APPARATUS CONTROL METHOD

(75) Inventor: Toshiya Seki, Odawara (JP)

(73) Assignee: Hitachi, Ltd., Tokyo (JP)

( * ) Notice: Subject to any disclaimer, the term of this patent is extended or adjusted under 35 U.S.C. 154(b) by 232 days.

(21) Appl. No.: 13/256,267

(22) PCT Filed: Aug. 29, 2011

(86) PCT No.: PCT/JP2011/004798
§ 371 (c)(1),
(2), (4) Date: Sep. 13, 2011

(87) PCT Pub. No.: WO2013/030867
PCT Pub. Date: Mar. 7, 2013

(65) Prior Publication Data
US 2013/0055013 A1    Feb. 28, 2013

(51) Int. Cl.
*G06F 11/00*    (2006.01)
(52) U.S. Cl.
USPC ............ 714/6.22; 714/6.2; 714/6.1; 714/6.24

(58) Field of Classification Search
USPC .................. 714/6.1, 6.2, 6.22, 6.23
See application file for complete search history.

(56) References Cited

U.S. PATENT DOCUMENTS

2011/0029728 A1*  2/2011  Popovski et al. ............. 711/114

FOREIGN PATENT DOCUMENTS

| WO | 2010/097832 A1 | 9/2010 |
| WO | 2011/086598 A1 | 7/2011 |

\* cited by examiner

*Primary Examiner* — Sarai Butler
(74) *Attorney, Agent, or Firm* — Mattingly & Malur, PC

(57) ABSTRACT

The present invention reduces the amount of rebuild processing and executes a rebuild process efficiently. Multiple storage devices configure a parity group. Of the multiple storage devices, a prescribed storage device in which a failure has occurred is blocked. Each storage device stores management information. The management information manages from among the storage areas of the storage device a prescribed area having data from a higher-level apparatus. A controller determines whether a storage area of the prescribed storage device is the prescribed area based on the management information, and executes a rebuild process with respect to the area determined to be the prescribed area.

8 Claims, 25 Drawing Sheets

FIG. 7

| | T11 |
|---|---|
| Logical page/physical page conversion table | |
| C110 | C111 |
| Logical page # | Physical page # |
| 0 | Unallocated |
| 1 | Unallocated |
| 2 | Unallocated |
| ... | ... |
| 5 | 6350 |
| ... | ... |
| 8 | 12702 |
| ... | ... |

STORAGE CONTROL APPARATUS AND STORAGE CONTROL APPARATUS CONTROL METHOD

TECHNICAL FIELD

The present invention relates to a storage control apparatus and a control method for the storage control apparatus.

BACKGROUND ART

In a storage control apparatus, data is protected using a technology called RAID (Redundant Array of Independent Disks). In methods that utilize parity like RAID5 and RAID6, even if a portion of the storage devices malfunction, the data stored in the malfunctioning storage devices can be restored based on data of other normal storage devices.

When a failure occurs in any of the multiple storage devices that belong to a parity group (a RAID group), a blocking process is executed. The blocking process is a process for halting the use of a storage device, and isolating this storage device from the system.

The data stored in a blocked storage device is restored to a spare storage device using a process called a rebuild process. That is, in the rebuild process, data (including parity) is read from each of the other, normal storage devices belonging to the same parity group as the blocked storage device, and the data inside the blocked storage device is restored by subjecting these data to a logical operation. The restored data is transferred and written to a spare storage device (an unused storage device). The rebuild process is also called a correction copy process.

However, in recent years there has come to be known a technology called thin provisioning in which a virtual volume is provided to a host computer (hereinafter, host), and an actual storage device is only allocated to an area that has been write-accessed by the host. In thin provisioning, an actual storage area inside a pool is only allocated to the area in which data is actually to be written.

In thin provisioning technology, in a case where a failure occurs in a storage device, a technology for executing the rebuild process only for an area allocated to a virtual volume is known (Patent Literature 1).

CITATION LIST

Patent Literature

[PTL 1]
WO 2010/097832

SUMMARY OF INVENTION

Technical Problem

According to the prior art, since the rebuild process is only executed for the storage area that is allocated to the virtual volume, the time required for the rebuild process can be shortened. However, in a case where thin provisioning technology is not used, it is not easy to determine in which area of a storage device data is actually written.

Therefore, under normal circumstances, it is necessary to execute the rebuild process for all the storage areas of the blocked storage device and to restore the data inside a spare storage device. Consequently, time is needed for the rebuild process to be completed.

In addition, when a rebuild process is being executed, the microprocessor, memory and other such computer resources of a storage control apparatus are used for the rebuild process, thereby making it impossible to rapidly process a command from the host. Thus, the load on the storage control apparatus increases, response performance drops, and user usability is reduced.

With the above-mentioned problems in mind, an object of the present invention is to provide a storage control apparatus and a storage control apparatus control method that make it possible to reduce the amount of rebuild processing. Another object of the present invention is to provide a storage control apparatus and a storage control apparatus control method that make it possible to determine the presence of data to be targeted for a rebuild process based on management information stored inside the storage device. Yet another object of the present invention is to provide a storage control apparatus and a storage control apparatus control method that make it possible to determine whether an area is a data area or a parity area, and in accordance with the result of this determination, to determine whether or not the area should be the target of a rebuild process.

Solution to Problem

To solve for the above-mentioned problems, a storage control apparatus according to the present invention is a storage control apparatus that is used by a higher-level apparatus, and comprises a controller and multiple storage devices, which are controlled by the controller, the multiple storage devices configure a parity group, which enables data restoration by parity, and the storage control apparatus comprises a blocking process part for blocking a prescribed storage device of the multiple storage devices, a management information storage part, management information storage part, and to determine whether the parity area is the prescribed area based on the management information related to the data area(s) and a prescribed determination criterion.

The management information managed by the management information storage part may manage for each area of a prescribed size the storage area of the storage device, with a first value denoting the number of data writes at production being associated with a second value denoting the current number of data writes. The prescribed determination criterion may be used to determine an area for which the first value and the second value do not match as being the prescribed area.

The management information may associate and manage with the second value a third value, which denotes whether or not the data of the prescribed size area has been erased. The prescribed determination criterion, in a case where the third value does not denote a data deletion, may be used to determine an area for which the first value and the second value do not match as being the prescribed area.

The third value may be configured as the most significant bit of the second value. In a case where the data inside the prescribed size area has been erased, the most significant bit which stores management information for managing for each of the storage devices a prescribed area having data from the higher-level apparatus from among the storage areas of the respective multiple storage devices, a determination part for determining whether a storage area of the prescribed storage device is a prescribed area based on the management information, and a rebuild control part for executing a rebuild process for an area, which has been determined to be the prescribed area of the storage areas of the prescribed storage device.

The management information storage part can be included in each of the multiple storage devices.

The determination part determines for each stripe set in the parity group whether a storage area of the prescribed storage device is a data area or a parity area, and in a case where the storage area is determined to be a data area, is also able to acquire management information related to the parity area corresponding to this data area from the management information storage part, and to determine whether the data area is the prescribed area based on the management information related to the parity area and a prescribed determination criterion, and in a case where the storage area is determined to be a parity area, is also able to acquire management information related to the data area(s) corresponding to this parity area from the may be set to ON, and in a case where data has been written to the prescribed size area, the most significant bit may be set to OFF.

The management information storage part is disposed inside the controller, and may manage the presence or absence of a prescribed area with respect to the multiple storage devices.

The characteristic features of the present invention described above can be combined in various ways other than those stated. In addition, the present invention can also be understood as a computer program. The computer program is installed in a computer via a communication medium or a recording medium.

BRIEF DESCRIPTION OF DRAWINGS

FIG. 7 is a table for converting a logical page to a physical page.

DESCRIPTION OF EMBODIMENT

Figure 1:
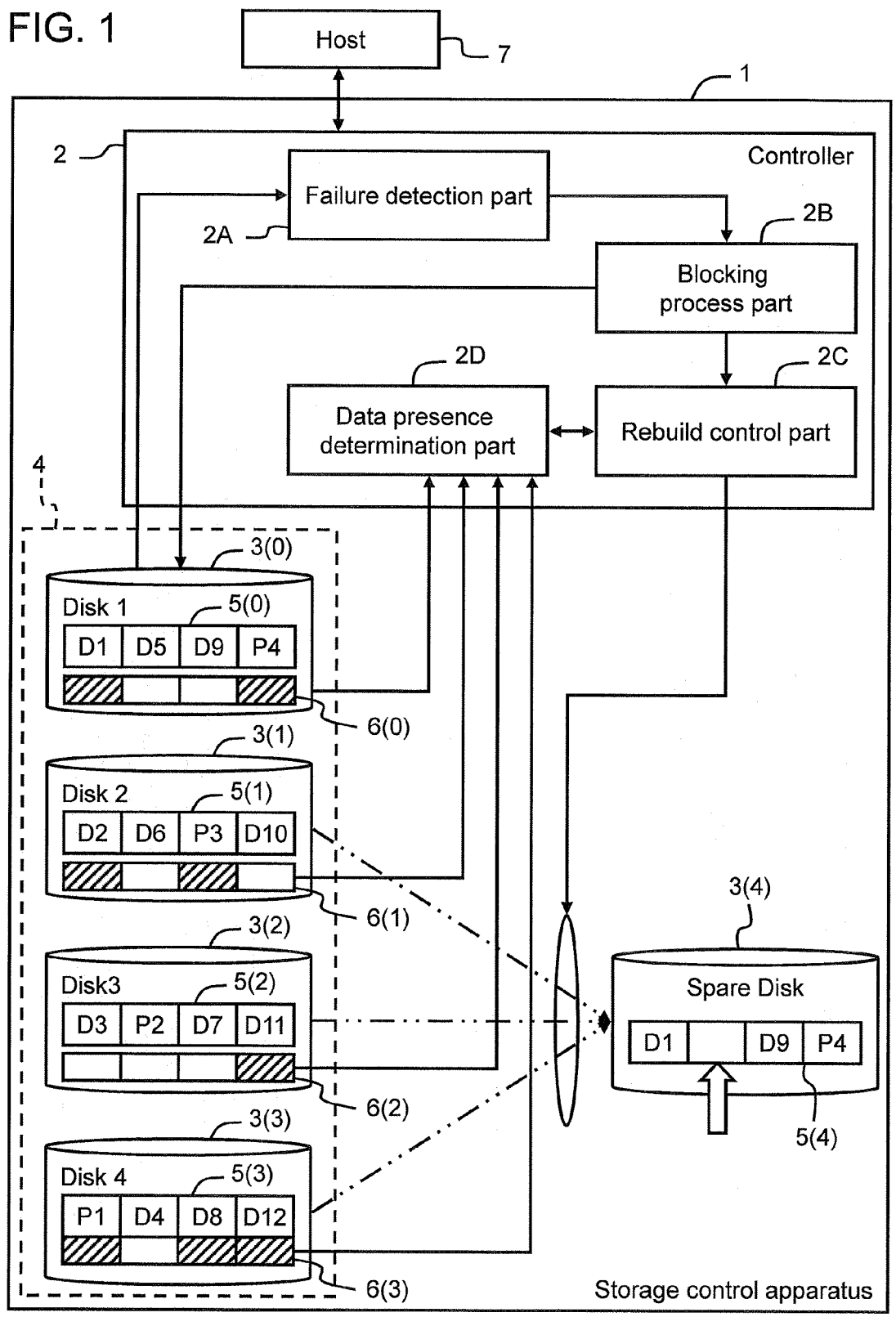
FIG. 1 is an illustration showing an overview of an embodiment of the present invention.

An embodiment of the present invention will be explained below based on the drawings. FIG. 1 shows an overview of this embodiment. The present invention is not limited to the configuration shown in FIG. 1.

The computer system shown in FIG. 1 comprises a storage control apparatus 1 and a host 7. The storage control apparatus 1, for example, is coupled to enable two-way communication with the host 7 as a "higher-level apparatus" via a communication network such as either a IP-SAN (Internet Protocol-SAN) or a FC-SAN (Fibre Channel-Storage Area Network).

The storage control apparatus 1 provides a storage area to the host 7. The storage control apparatus 1 comprises at least one controller 2, and multiple storage devices 3(0) through 3(4). Hereinbelow, in a case where no particular distinction is made, the storage devices 3(0) through 3(4) will be called storage device 3.

The storage device 3 will be explained first. Various devices capable of reading and writing data can be used as the storage device 3, such as a hard disk drive, a semiconductor memory device, an optical disk device, and a magneto-optical disk device.

As the hard disk drive, for example, a FC (Fibre Channel) disk, a SCSI (Small Computer System Interface) disk, a SATA disk, an ATA (AT Attachment) disk, and a SAS (Serial Attached SCSI) disk can be used.

In addition, for example, a flash memory device (SSD: Solid State Drive), a FeRAM (Ferroelectric Random Access Memory), a MRAM (Magnetoresistive Random Access Memory), an Ovonic Unified Memory, and a RRAM (Resistance RAM: registered trademark) can also be used as the storage device.

In this example, the storage device 3 will be explained by giving as an example a flash memory device, which is able to store management information 6 such as the number of data writes.

A single parity group 4 is configured from multiple storage devices 3. The parity group 4 groups together physical storage areas of the respective storage devices 3. A logical volume 240 (refer to FIG. 3), which is a logical storage device, is created from the physical storage areas that have been virtualized in accordance with the parity group 4.

Each storage device 3 is able to store data from the host 7. In FIG. 1, the data inside the storage devices 3(0) through 3(4) are depicted as stripe sets 5(0) through 5(4). In a case where no particular distinction is made, the stripe sets 5(0) through 5(4) will be called the stripe set 5.

In addition, management information 6(0) through 6(3) denoting the number of data writes is stored in the respective storage devices 3(0) through 3(3). Management information 6 is also stored in a spare storage device 3(4), but this management information 6 has been omitted in FIG. 1. In a case where no particular distinction is made, the management information 6(0) through 6(3) will be called the management information 6. As will be explained further below using FIG.

10, the management information 6 manages numbers of data writes N1 and N2 for each prescribed size with respect to storage areas of the storage device 3.

The number of writes N1 denotes the number of data writes at the time the storage device 3 was manufactured as a "first value". The number of writes N2 as a "second value" denotes the current number of data writes.

The configuration of the controller 2 will be explained. The controller, for example, is configured as a computer apparatus comprising a microprocessor, a memory, and a communication interface. The following functions 2A, 2B, 2C, and 2D are realized by the microprocessor reading and executing a prescribed computer program stored in the memory.

A failure detection part 2A is a function for detecting a failure that has occurred in each storage device 3. The type of failure will vary in accordance with the extent thereof. It is supposed here that the failure detection part 2A detects a failure to the extent that requires the storage device 3 be blocked.

A blocking process part 2B is a function for executing a blocking process with respect to a prescribed storage device 3 in which the occurrence of a failure was detected. The blocking process halts the use of the storage device 3 in which the failure occurred, and isolates this storage device 3 from the system (the storage control apparatus 1).

A rebuild control part 2C is a function for controlling the rebuild process. The rebuild control part 2C executes the rebuild process in accordance with a determination result from a determination part 2D, which will be explained further below, with respect to a storage device 3 notified from the blocking process part 2B. That is, the rebuild control part 2C executes the rebuild process for an area, which, of all the storage areas in the blocked storage device 3, has been determined to be storing data that should be restored.

A data presence determination part 2D is a function for determining whether data that will become the target of the rebuild process (data to be restored) is being stored. The data presence determination part 2D determines whether or not data is being stored based on a preset determination criterion.

The data presence determination part 2D, for example, can determine that an area, for which the number of data writes at production N1 and the current number of data writes N2 do not match, is an area in which data has been written from the host 7. This is because the initial value N1 and the current value N2 should match in a case where data has not been written.

In a case where either a data erase command or a volume formatting command has been issued from the host 7, the most significant bit of the current number of data writes N2 is set to the ON state. The ON state, for example, signifies that a value other than 0 is set. Including information (a third value) denoting that data has been erased in the current number of data write N2 makes it possible to manage the presence or absence of data without increasing the size of the management information.

In a case where a third value denoting a data erase (most significant bit is ON) is set in the management information 6, the data presence determination part 2D can determine that data is not written in the area even when the N1 and N2 do not match.

The configuration of the data stored in the storage device 3 will be explained in detail. The data stored in the storage device 3 includes normal data and parity data. The parity is computed by subjecting the data stored in each data area in a stripe set to a logical operation.

Therefore, in a case where the target area included in a storage area of a blocked storage device 3 is a data area, and the parity for this data area has been computed, a determination can be made that data is written in the target area. That is, in a case where a parity is written in the parity area corresponding to the target area, the target area becomes a rebuild target.

A case in which the target area of the blocked storage device 3 is a parity area will be considered. In a case where data is not written to any of the other data areas corresponding to this parity area, it is conceivable that parity has not been computed. Therefore, the target area, which is the parity area, does not become the rebuild target. Alternatively, in a case where data is written in any of the data areas corresponding to the parity area, the parity has probably been computed. Therefore, the target area becomes the rebuild target.

This will be explained using the example shown in FIG. 1. It is supposed that a failure has occurred in the storage device 3(0). Look at the first stripe block (target stripe block) of the stripe set. The first stripe block (parity area P1) of the storage device 3(3), which corresponds to this target stripe block, has been updated. Whether updating has been carried out or not, as described hereinabove, can be determined from a change in the number of data writes. Therefore, the first stripe block is the target of the rebuild process, and the data (D1) is restored inside a spare storage device 3(4).

A case in which the second stripe block is the target stripe block will be considered. The target stripe block is a data area. Neither data nor parity is written in the stripe blocks inside the other storage devices 3 corresponding to the target stripe block. Therefore, a determination can be made that data is also not written in the target stripe block. The second stripe block does not constitute the target of the rebuild process. Therefore, second stripe block data is not restored to the spare storage device 3(4).

In a case where a third stripe block is the target stripe block, the result is the same as that for the first stripe block. The third stripe block of the storage device 3(1), which corresponds to the target stripe block, is a parity area (P3), and this parity area has been updated. Therefore, the third stripe block constitutes the target of the rebuild process, and data (D9) is restored in the spare storage device 3(4).

A case in which a fourth stripe block is the target stripe block will be considered. The target stripe block is a parity area. Of the data areas corresponding to this parity area, the data area of the storage device 3(2) and the data area of the storage device 3(3) have both been updated. Therefore, it can be concluded that the parity inside the target stripe block has also been updated. Accordingly, the parity (P4) is restored inside the spare storage device 3(4).

This embodiment, which is configured in this way, determines whether or not the rebuild process is necessary, and executes the rebuild process for an area that requires rebuild processing. Therefore, the amount of rebuild processing can be reduced compared to a case where rebuild processing is carried out for all of the storage areas in a blocked storage device. As a result of this, rebuild processing time can be shortened, the processing load on the storage control apparatus 1 can be reduced, and drops in response performance can be held in check.

Furthermore, as will be described further below, since this prevents a situation in which data is not restored that should be restored, an area in which even a little data to be restored could exist is targeted for the rebuild process.

In this embodiment, in a case where a determination is made as to whether or not rebuild processing should be carried out for a target area, a distinction is made between whether this target area is a data area or a parity area. In this embodiment, the management information 6 acquisition range changes in accordance with the type of target area. As was explained hereinabove, in a case where the target area is a data area, the determination part 2D makes a determination to acquire only management information 6 with respect to the parity area corresponding to this data area. In a case where the target area is a parity area, the determination part 2D makes a determination to acquire the management information 6 of each data area corresponding to this parity area. Therefore, this embodiment makes it possible to efficiently determine whether or not an area should be targeted for rebuild processing in accordance with the type of target area.

In this embodiment, whether or not data is written in an area is determined in accordance with the management information 6 inside the storage device 3. That is, in this embodiment, management information 6 is stored inside each storage device 3. Therefore, in this embodiment, since there is no need to store large amounts of management information in the memory inside the controller 2, the memory in the controller 2 can be used to process a command from the host 7. As a result of this, it is possible to curb a drop in response performance.

In this embodiment, the management information 6 comprises the number of data writes at production N1 and a current number of data writes N2. Therefore, a determination can be made right away as to whether or not data is written in an area based on the difference between these N1 and N2.

In this embodiment, information (a third value) denoting that data has been erased is included in the current number of data writes N2. Therefore, in a case where information denoting a data erase has been set, a determination can be made that data is not written in an area even when the number of data writes at production N1 and the current number of data writes N2 do not match.

In this embodiment, the information denoting that data has been erased is set in the most significant bit of the current number of data writes N2. In this embodiment, a case in which the most significant bit is set to the ON state signifies that the data of this area was erased.

Normally, the number of digits for the number of data writes is set so as to sufficiently exceed the practical upper limit value. Therefore, it is practically unthinkable that a value would be set in the most significant bit of the number of data writes. This is because in most cases the life of the storage device 3 would end before the most significant bit would be used.

In this embodiment, the normally unused most significant bit is used to set information denoting that a data erase process has been carried out. Therefore, the presence of a data write and the presence of a data erase can be efficiently managed without increasing the size of the management information 6.

Example 1

Figure 2:
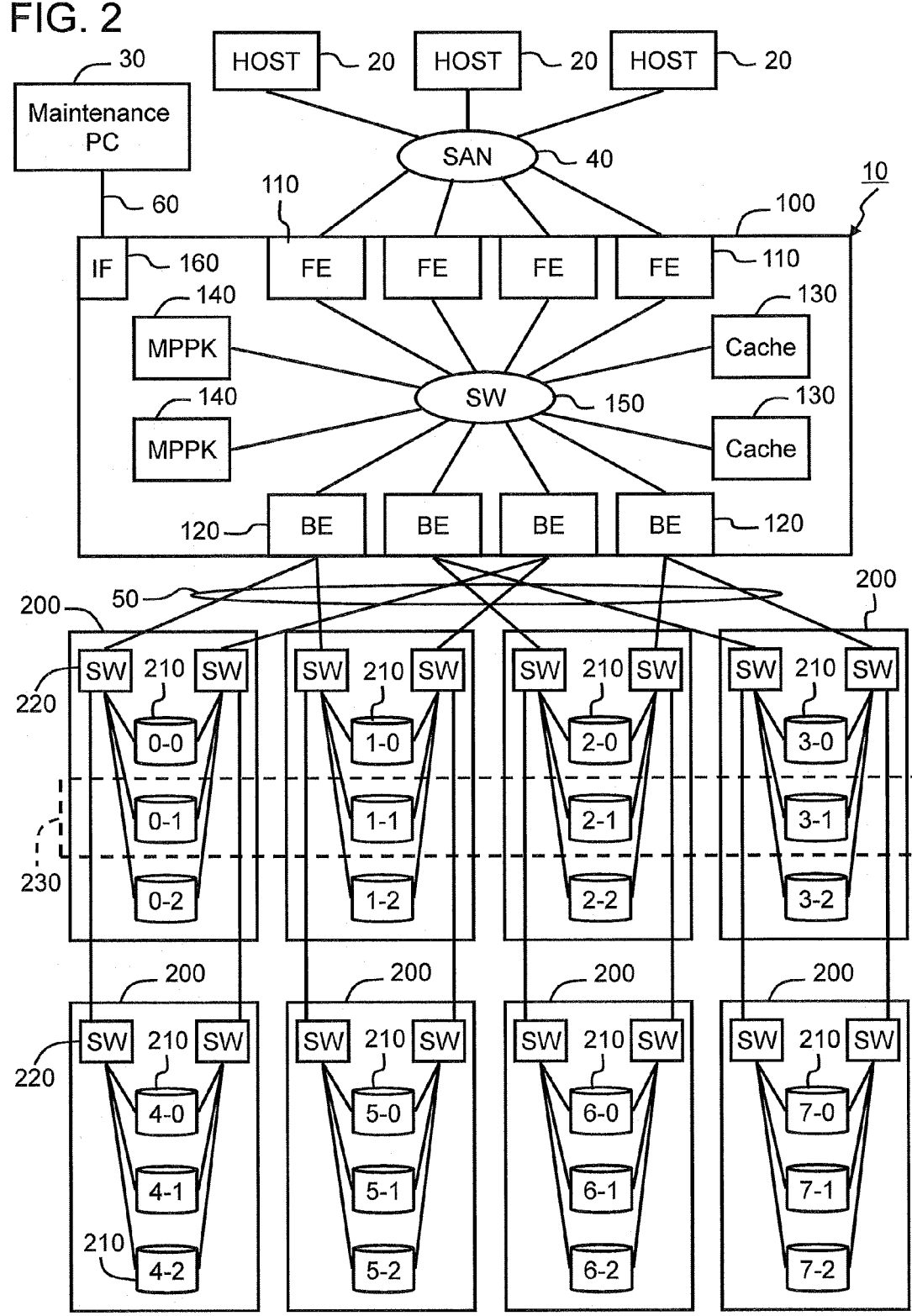
FIG. 2 is a diagram of an entire computer system comprising a storage control apparatus.

FIG. 2 shows the overall configuration of the computer system. The corresponding relationship with FIG. 1 will be explained first. A storage control apparatus 10 corresponds to the storage control apparatus 1, a host 20 corresponds to the host 7, and a storage device 210 corresponds to the storage device 3. The functions 2A, 2B, 2C, and 2D are realized by a microprocessor package 140 inside a controller 100.

The computer system, for example, comprises a storage control apparatus 10, multiple hosts 20, and a maintenance terminal 30. The storage control apparatus 10 comprises at least one controller 100 and multiple drive installation parts 200.

The storage control apparatus 10 and the respective hosts 20 are coupled via a communication network 40 such as either an IP-SAN or a FC-SAN. The storage control apparatus 10 and the maintenance terminal 30, for example, are coupled via a communication path 60 such as a LAN (Local Area Network). The controller 100 and the respective drive installation parts 200, for example, are coupled via a communication path 50 such as a FC-SAN. Furthermore, the communication configuration may be a configuration other than the one described above. Also, the host 20, the controller 100, the drive installation part 200, and the maintenance PC 30 may be coupled so as to be able to communicate wirelessly.

The configuration of the controller 100 will be explained. The controller 100, for example, comprises multiple front-end interface packages 110, multiple back-end interface packages 120, multiple memory packages 130, and multiple microprocessor packages 140. These packages 110, 120, 130 and 140 are coupled to one another via a switching circuit 150. In addition, a communication interface part 160 for communicating with the maintenance terminal 30 is disposed in the controller 100.

The front-end interface package (FE package hereinafter) 110 is a control substrate for two-way communications with the host 20, and comprises a microprocessor and a memory (neither of which is shown in the drawing).

The back-end interface package (BE package hereinafter) 120 is a control substrate for two-way communications with the respective storage devices 210 inside the drive installation part 200, and comprises a microprocessor and a memory (neither of which is shown in the drawing).

The memory package 130 is a substrate for providing a cache memory area and a shared memory area. The cache memory area stores write data received from the host 20 and read data read from the storage device 210. The shared memory stores various control information required for controlling the storage control apparatus 10, and management information (differs from the management information inside the SSD).

The microprocessor package (MP package hereinafter) 140 is a control substrate for controlling the storage control apparatus 10, and comprises multiple microprocessors and at least one local memory (not shown in the drawing). The MP package 140 realizes a failure detection process, a blocking process, and a rebuild control process in accordance with reading and executing a prescribed computer program. The prescribed computer program can be stored in either the memory package 130 or the storage device 210.

The drive installation part 200 comprises multiple storage devices 210 and multiple switching circuits 220. As was explained hereinabove, a hard disk drive, a flash memory device (SSD) and so forth can be used as the storage device 210. In this example, an explanation will be given using a flash memory device capable of storing the number of data writes as an example, FIG. 3 is an illustration schematically showing the relationship between the storage devices 210, and RAID groups (parity groups) 230 and logical volumes 240.

Figure 3:
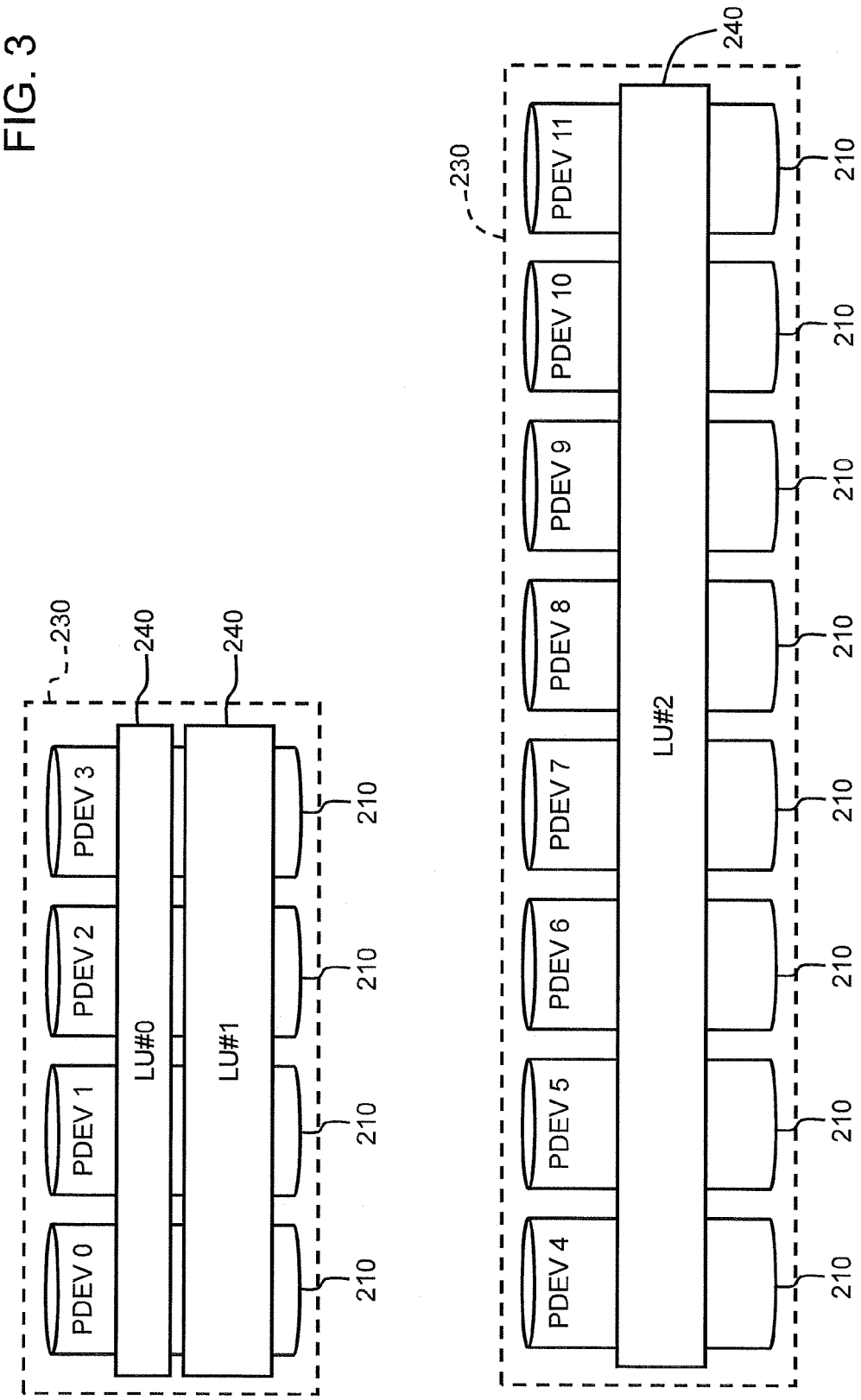
FIG. 3 is an illustration showing RAID configurations.

As shown in FIG. 3, one RAID group 230 can be configured from multiple storage devices 210. One or more logical volumes 240 can be created using the physical storage areas that have been virtualized by the RAID group 230.

The upper portion of FIG. 3, for example, shows a situation in which a RAID group 230 of RAID5 has been created from four storage devices 210 (PDEVs 0 through 3), and multiple logical volumes 240 (#0 and #1) are disposed in this RAID group 230.

The bottom portion of FIG. 3 shows a situation in which a RAID group 230 of RAID6 has been created from eight storage devices 210 (PDEVs 4 through 11), and one logical volume 240 (#2) is disposed in this RAID group 230. Furthermore, PDEV signifies a physical device, that is, a physical storage device 210. Alternatively, the logical volume 240 is called either a logical unit (LU) or a logical device (LDEV).

Figure 4:
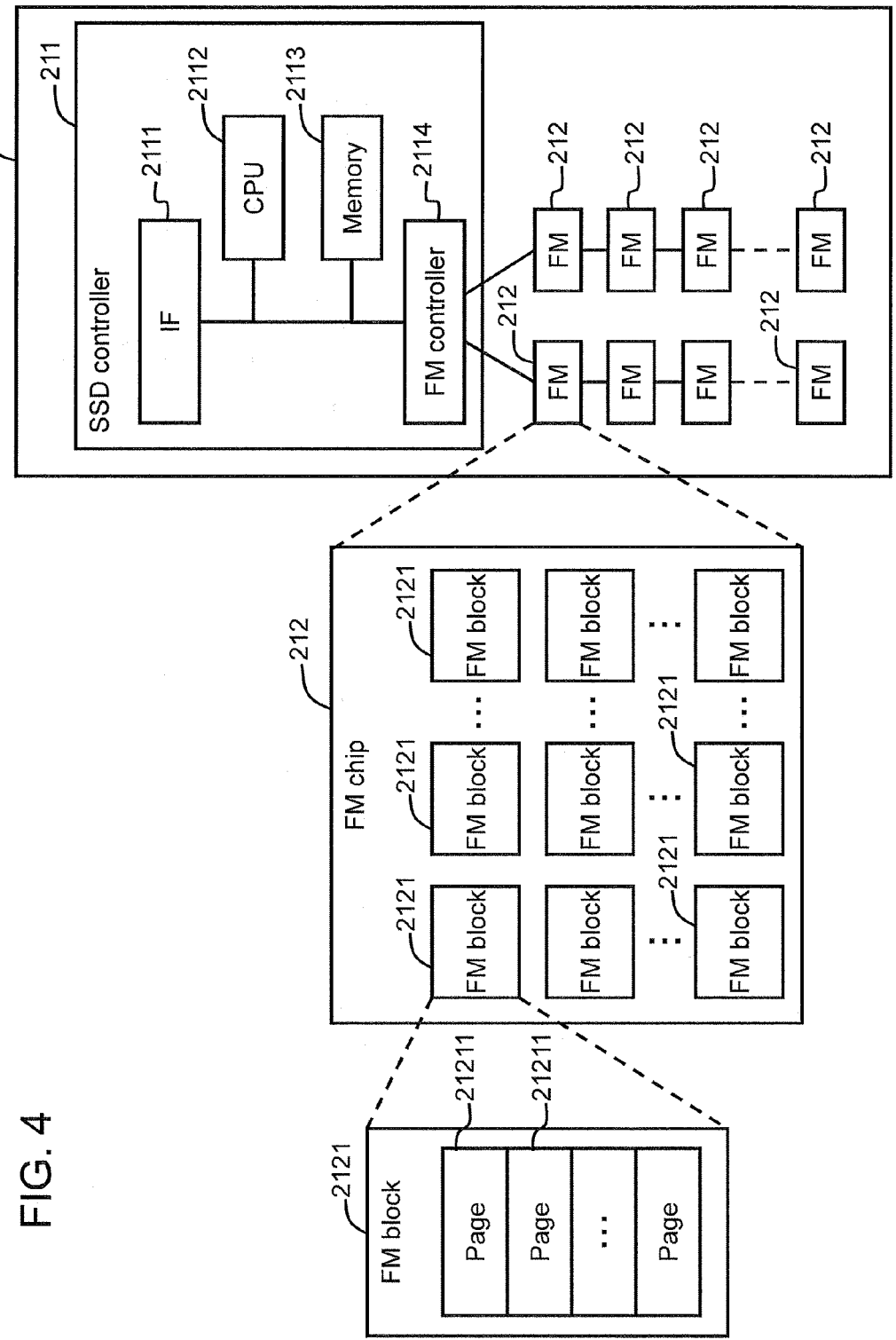
FIG. 4 is an illustration showing the configuration of a SSD.

FIG. 4 shows the configuration of a flash memory device. The right side of FIG. 4 shows the hardware configuration of a flash memory device serving as the storage device 210. Hereinafter, a storage device 210 configured as a flash memory device will be called a SSD 210.

The SSD 210, for example, comprises at least one SSD controller 211 and multiple flash memory chips 212. The flash memory may be abbreviated as FM hereinbelow. In the drawing, the FM chip may be abbreviated as FM.

The SSD controller 211 is a circuit for controlling the SSD 210. The SSD controller 211, for example, comprises an interface part 2111, a microprocessor 2112, a memory 2113, and a FM chip controller 2114.

The interface part 2111 is a communication circuit for two-way communications with the BE package 120 of the controller 100. The microprocessor 2112 controls the operation of the SSD 210 in accordance with an instruction from the controller 100. The memory 2113 stores a computer program, which is read by the microprocessor 2112, and information T20 (refer to FIG. 1) for managing the number of data writes. The FM chip controller (FM controller in the drawing) 2114 controls the data input/output to the respective FM chips 212.

As shown in the center portion of FIG. 4, one FM chip 212 comprises multiple FM blocks 2121. As shown in the left side of FIG. 4, one FM block 2121 comprises multiple pages 21211. Although omitted from the drawing, one page 21211 is configured from multiple logical blocks.

As one example, the size of a logical block is 520 bytes. One page 21211 comprises 16 logical blocks. One block 2121 comprises 32 pages 21211.

The host 20 issues either a write command or a read command in units of logical pages. The IO (Input/Output) unit of the host 20 is a logical page unit. However, the host 20 erases data in units of blocks 2121. A data erase command issued from the host 20 erases data in units of blocks 2121.

The SSD 210 is unable to do a so-called overwrite. Therefore, it is necessary to erase an invalid data page 21211 to return the SSD 210 a writable state. The process for enabling a location that has been used once to be used again is called a reclamation process.

As was described hereinabove, a data erase is carried out in units of blocks 2121. Therefore, in a case where a valid page 21211 and an invalid page 21211 coexist inside one block 2121, it is not possible to erase data in block units. Consequently, valid page data inside an erase-target block 2121 is copied to a page 21211 inside another block 2121, and the erase-target block 2121 is configured from only invalid pages. Issuing a data erase command to the block 2121 comprising only invalid data enables the data to be erased from this block 2121.

Figure 5:
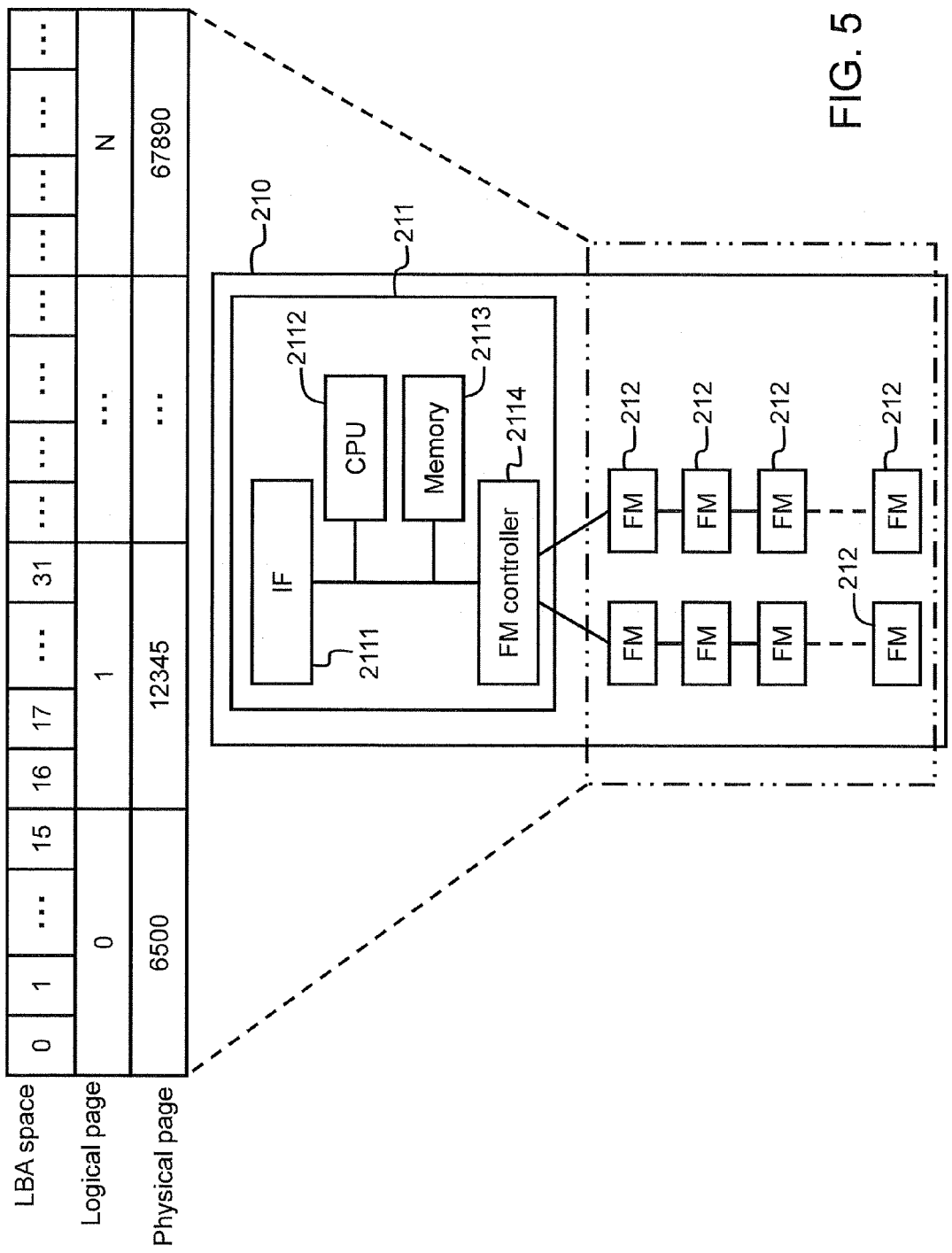
FIG. 5 is an illustration showing the relationship between an LBA space, a virtual page and a physical page of the SSD.

FIG. 5 is an illustration showing the storage configuration of the SSD 210. At the top of FIG. 5, a logical address space (a LBA space) is shown. The LBA space is equivalent to a logical block. The host 20 specifies the LBA and issues either a write command or a read command.

A logical page space is shown beneath the LBA space. The address space of the logical volume 240 can be partitioned into multiple logical pages. A physical page space is shown beneath the logical page space. The physical page is equivalent to a page 21211 inside the FM block 2121. The physical page shows the place where the data is actually stored. Changing the corresponding relationship between a logical page number and a physical page number makes it possible to change the actual storage destination of data.

Figure 6:
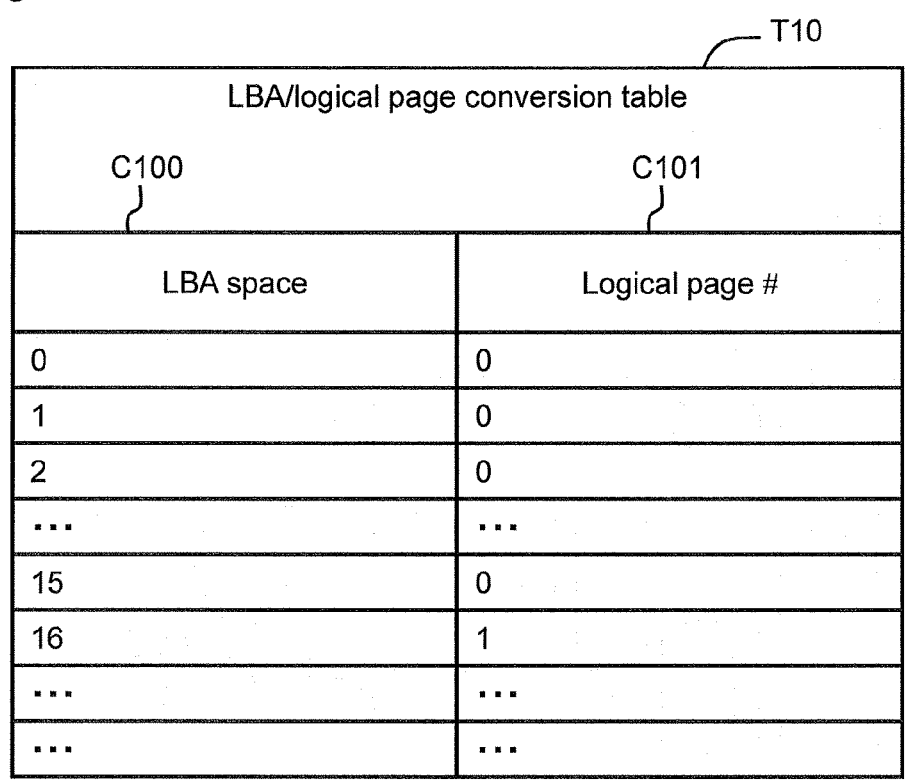
FIG. 6 is a table for converting a LBA to a logical page.

FIG. 6 shows a table T10 for mutually converting a LBA and a logical page number. This conversion table T10 can be stored inside the memory 2113 of the SSD controller 211.

The LBA/logical page conversion table T10, for example, correspondingly manages a LBA space C100 and a logical page number C101.

FIG. 7 shows a table T11 for mutually converting a logical page number and a physical page number. This conversion table T11 can also be stored inside the memory 2113 of the SSD controller 211.

The logical page/physical page conversion table T11, for example, corresponding manages a logical page number C110 and a physical page number C111. Furthermore, "unallocated" is set in the physical page number C111, which is not allocated to a logical page.

Figure 8:
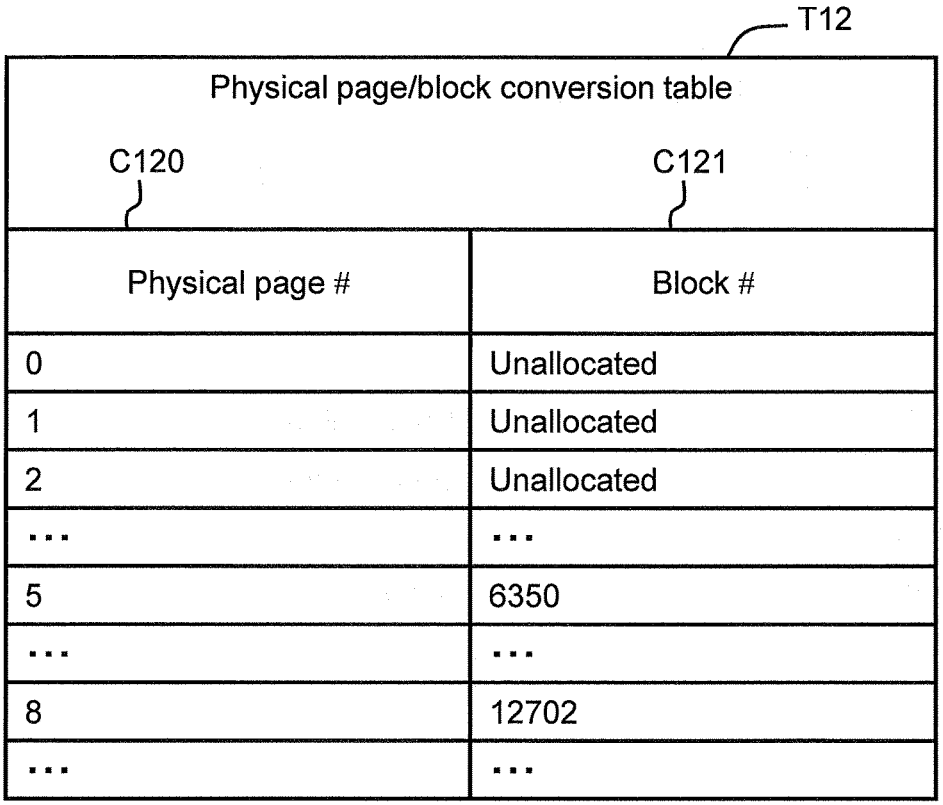
FIG. 8 is a table for converting a physical page to a block.

FIG. 8 shows a table T12 for mutually converting a physical page number and a block number. This conversion table T12 can also be stored in the memory 2113 of the SSD controller 211.

The physical page/block conversion table T12, for example, correspondingly manages a number C120 for identifying a physical page 21211, and a number C121 for identifying a FM block 2121.

Figure 9:
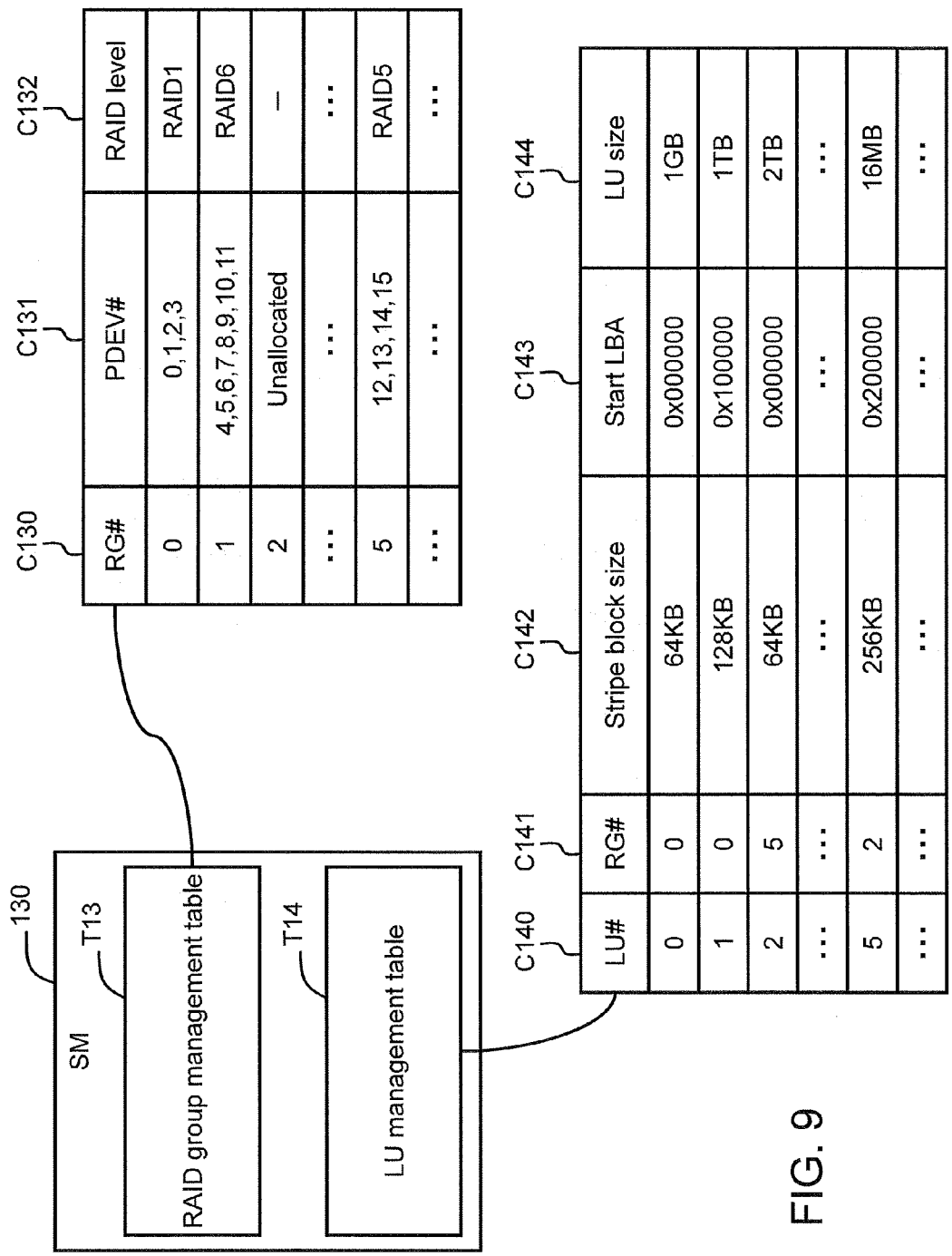
FIG. 9 is a table for managing a RAID group and a table for managing a logical volume.

FIG. 9 shows a RAID group management table T13 and a logical volume management table T14. The table T13 for managing the RAID group 230, for example, correspondingly manages a RAID group number C130, a storage device number C131, and a RAID level C132.

Information for identifying a RAID group 230 is set in the RAID group number C130. Information for identifying a storage device 210 configuring the RAID group 230 is set in the storage device number C131. A RAID level, such as RAID1, 5 or 6, is set in the RAID level C132.

The table T14 for managing the logical volume 240, for example, correspondingly manages a logical volume number C140, a RAID group number C141, a stripe block size C142, a start logical address C143 of the logical volume 240, and a volume size C144.

Information for identifying each logical volume 240 managed by the storage control apparatus 10 is set in the logical volume number C140. Information for identifying the RAID group 230 to which a logical volume belongs is set in the RAID group number C141. The size of each stripe block configuring a stripe set is set in the stripe block size C142. The stripe block size may be made to match the size of the FM block 2121.

The start location of the logical volume 240 identified by the logical volume number C140 from among the storage areas of the RAID group 230 is set in the start logical address C143. The size of the logical volume 240 is set in the volume size C144.

Figure 10:
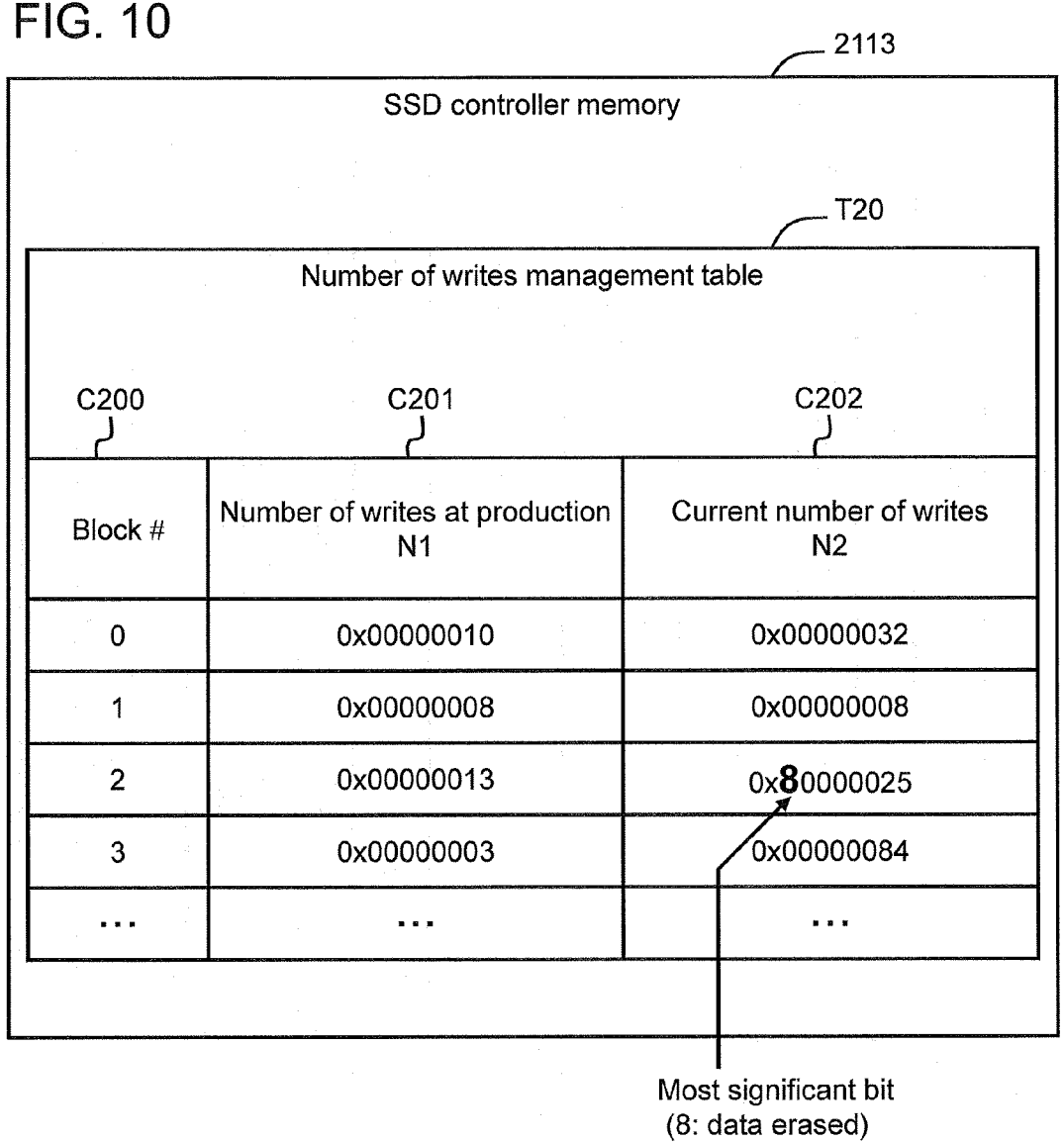
FIG. 10 is a table provided inside the SSD for managing the number of writes.

FIG. 10 shows a table T20 for managing a data write to the SSD 210. The number of writes management table T20 is prepared for each SSD 210. The number of writes management table T20, for example, is stored in the memory 2113 of the SSD controller 211.

The number of writes management table T20, for example, correspondingly manages a block number C200, the number of writes at production C201, and a current number of writes C202.

Information for identifying a FM block 2121 is set in the block number C200. The number of data writes (N1) of the FM block 2121 identified by the block number C200 at the time the SSD 210 was manufactured is set in the number of writes at production C201. The current number of data writes (N2) of the FM block 2121 is set in the current number of writes C202.

A case in which the most significant bit of the current number of data writes (N2) is set to a prescribed value (8 in the example of FIG. 10) signifies that data has been erased from this entire block regardless of the states of the lower bits.

Figure 11:
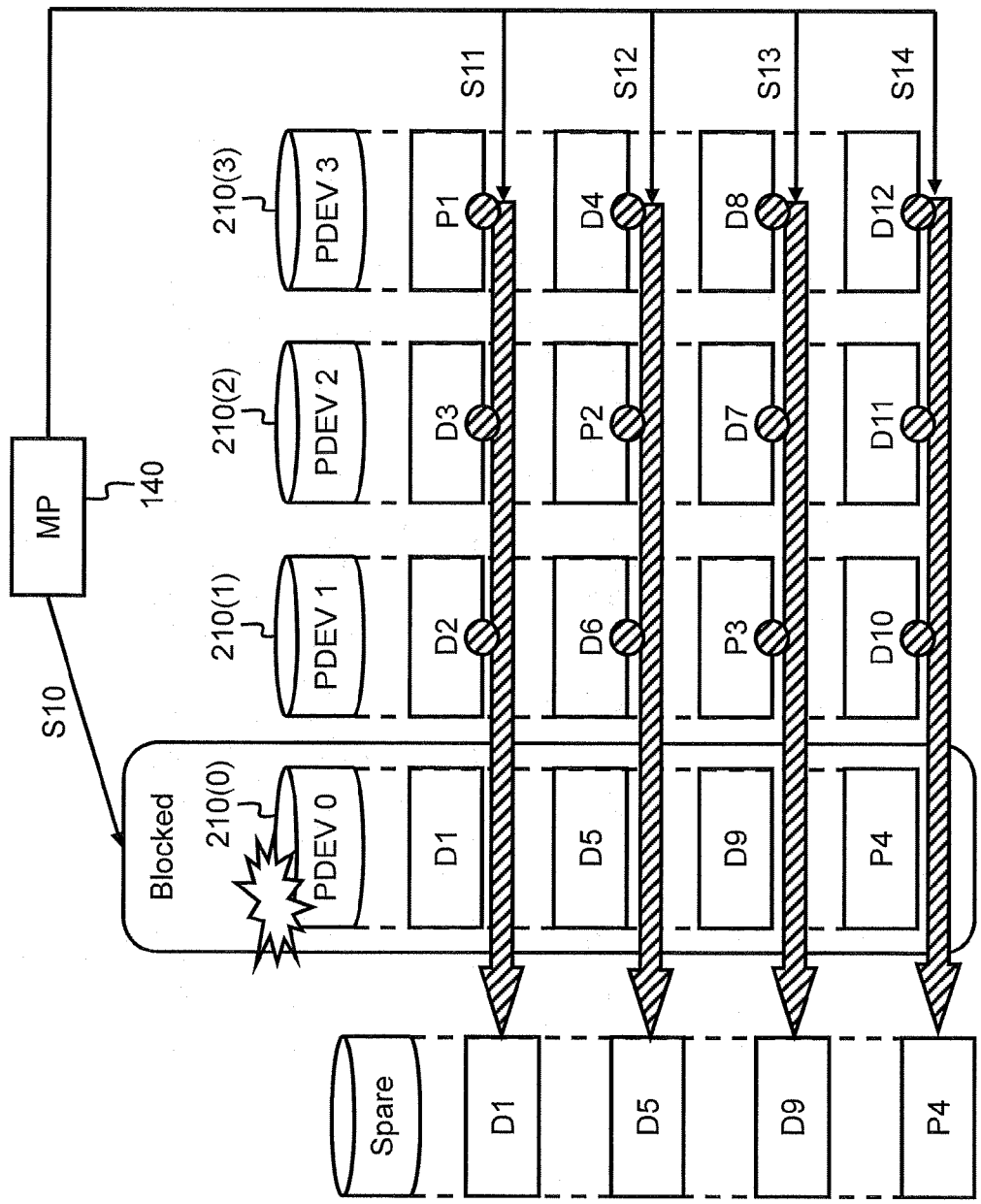
FIG. 11 is an illustration showing the basics of a rebuild process.

FIG. 11 shows the basics of a rebuild process. In FIG. 11, it is supposed that a RAID group 230 of RAID5 is configured from the four storage devices 210(0) through 210(3). In a case where a failure occurs in the storage device 210(0), the MP package 140 blocks this storage device 210(0) (S10).

The MP package 140 restores the data of the blocked storage device 210(0) and stores this data in a spare storage device 210 (S11 through S14). Each stripe set is configured from four stripe blocks.

Look at the first stripe set. The data (D1) stored in the stripe inside the blocked storage device 210(0) can be computed based on the data (D2, D3) and the parity (P1) stored in the other stripe blocks belonging to the same stripe set (S11).

Similarly, the data (D5) of the second stripe block can be computed based on the data (D6, D4) and parity (P2) stored in the other storage devices 210(1) through 210(3) (S12).

Similarly, the data (D9) of the third stripe block can be computed based on the data (D7, D8) and parity (P3) stored in the other storage devices 210(1) through 210(3) (S13). Similarly, the parity (P4) of the fourth stripe block can be computed based on the other data (D10, D11, D12) (S14).

To restore the data of the blocked storage device 210(0) inside the spare storage device 210 like this, a logical operation must be carried out with respect to all the storage areas of the blocked storage device 210(0). However, in this method, the rebuild process (the process for restoring the data) takes time, and the processing load on the controller 100 also increases.

Figure 12:
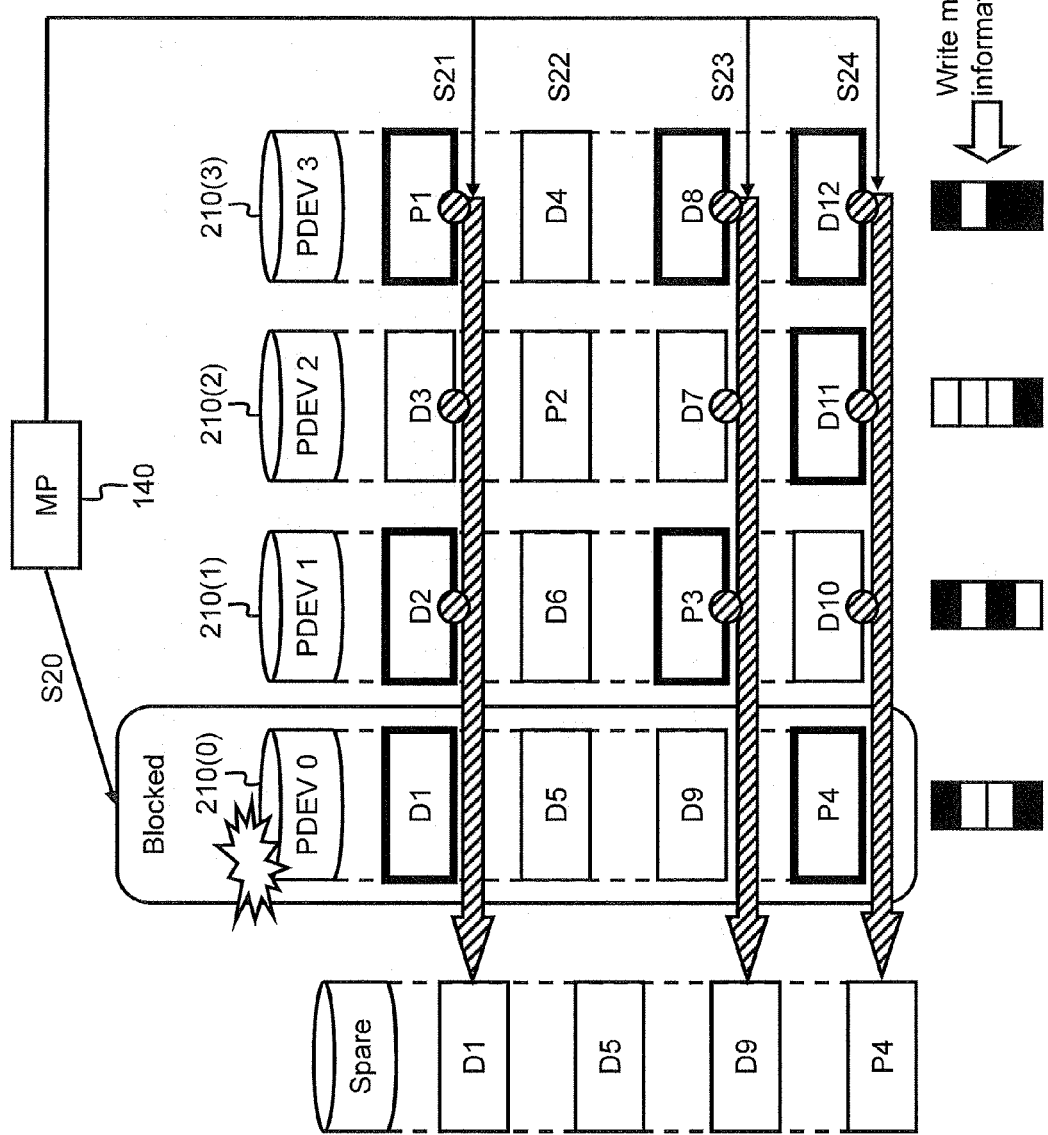
FIG. 12 is an illustration showing an outline of a rebuild process in accordance with this example.

Consequently, in this example, as shown in FIG. 12, the area requiring the rebuild process is detected, and a rebuild process is carried out for this detected area.

FIG. 12 shows an outline of the rebuild process in accordance with this example. Information for managing the presence or absence of a data write (a portion of the number of writes management table T20) is shown beneath each of the storage devices 210(0) through 210(3). A black square denotes that data is written and a white square denotes that data is not written. The order of the squares corresponds to the order of the stripe set. That is, the topmost square corresponds to the first stripe set. The method for determining whether or not data has been written will be explained further below. Furthermore, for ease of understanding, a stripe in which data is written is shown in FIG. 12 enclosed within a thick black border.

The MP package 140, upon detecting the storage device 210(0) in which the failure occurred, blocks this storage device 210(0) (S20).

According to the write management information, the parity (P1) inside the storage device 210(3) is written in the first stripe set. The fact that the parity has been updated signifies that the data of the stripe set managed by this parity has been updated. Therefore, the stripe block belonging to the first stripe set becomes the target of the rebuild process from among the storage areas of the blocked storage device 210(0). Consequently, the MP package 140 restores the data (D1) by subjecting the data (D2, D3) and parity (P1) to a logical operation, and writes this data (D1) to a spare storage device 210 (S21).

In the second stripe set, the parity (P2) inside the storage device 210(2) has not been updated. That is, the parity is not stored in the stripe block corresponding to the parity area within the stripe set. Therefore, a determination can be made that data is not written to the stripe blocks corresponding to the respective data areas within this stripe set. This is because, in a case where data is written, the parity is computed and written to the stripe block of the parity area. Therefore, the MP package 140 does not execute the rebuild process for the second stripe set (S22).

In the third stripe set, the parity (P3) is written in the stripe block corresponding to the parity area the same as was described for the first stripe set. Therefore, the stripe block belonging to the third stripe set becomes the target of the rebuild process from among the storage areas of the blocked storage device 210(0). The MP package 140 restores the data (D9) by subjecting the data (D7, D8) and parity (P31) to a logical operation, and writes this data (D9) to the spare storage device 210 (S23).

In the fourth stripe set, the stripe block corresponding to a parity area exists inside the blocked storage device 210(0). Data is written in the stripe blocks inside the storage device 210(2) and the storage device 210(3) from among the stripe blocks corresponding to the data areas belonging to this stripe set. Therefore, the stripe block belonging to the fourth stripe set becomes the target of the rebuild process from among the storage areas of the blocked storage device 210(0). The MP package 140 carries out a logical operation with respect to the data (D10, D11, D12), computes the parity (P4), and writes this parity (P4) to the spare storage device 210 (S24).

The operations of this example will be explained by referring to FIGS. 13 through 18. An overview of the processing is shown in each flowchart. Therefore, a so-called person of ordinary skill in the art should be able to change a portion of the steps shown in the drawings, add a new step, delete a portion of the steps, and rearrange the sequence of the steps.

Figure 13:
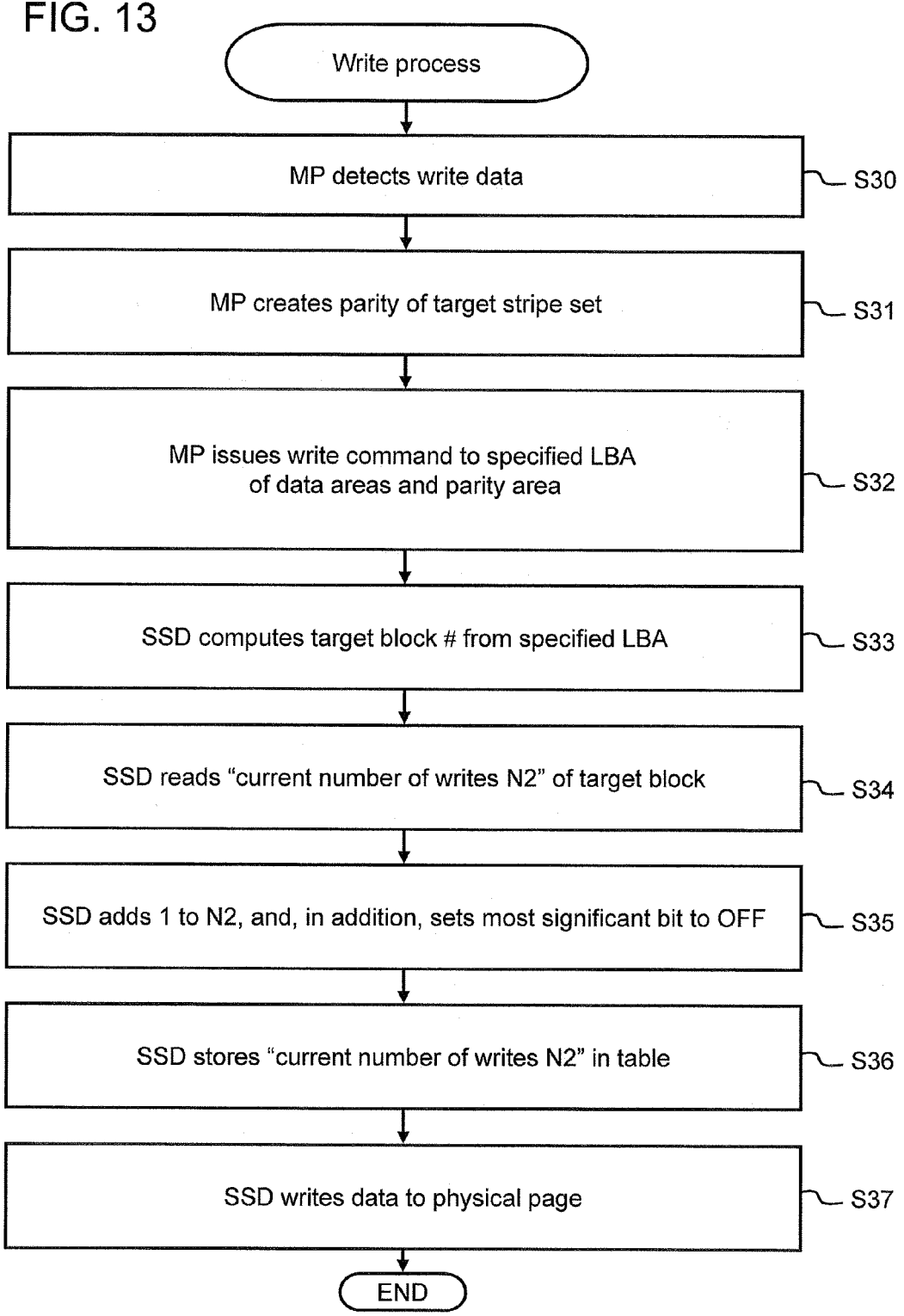
FIG. 13 is a flowchart showing a write process.

FIG. 13 is a flowchart showing a write process. A write command issued from the host 20 is received by the FE package 110. An area for storing the write data is reserved in the cache memory of the memory package 130. The write command received from the host 20 comprises a write data write-destination address (write-destination LBA) and a write data size.

The MP package 140, upon detecting the write data received from the host 20 (S30), computes the parity of the target stripe set to be written to the SSD 210 (S31).

The MP package 140 specifies a LBA and issues a write command for the respective data areas and one parity area included in the target stripe set (S32).

The SSD controller 211 computes the number of the target block based on the LBA specified by the MP package 140 (S33). The number of the target block 2121 corresponding to the specified LBA can be identified by using the conversion tables T10, T11 and T12 described using FIGS. 6, 7 and 8.

The SSD controller 211 reads the value of the "current number of writes N2" with respect to the target block from the number of writes management table T20 (S34). Furthermore, the number of data writes may be abbreviated as the number of writes.

The SSD controller 211 increments by 1 the value of the current number of writes N2, and sets the most significant bit of the current number of writes N2 to OFF (S35). That is, the SSD controller 211 sets 0 in the most significant bit of the current number of data writes N2.

The SSD controller 211 stores the "current number of writes N2" created in S35 in the number of writes management table T20 (S36). The SSD controller 211 writes the write data received from the MP package 140 to the physical page corresponding to the logical page (S37).

Figure 14:
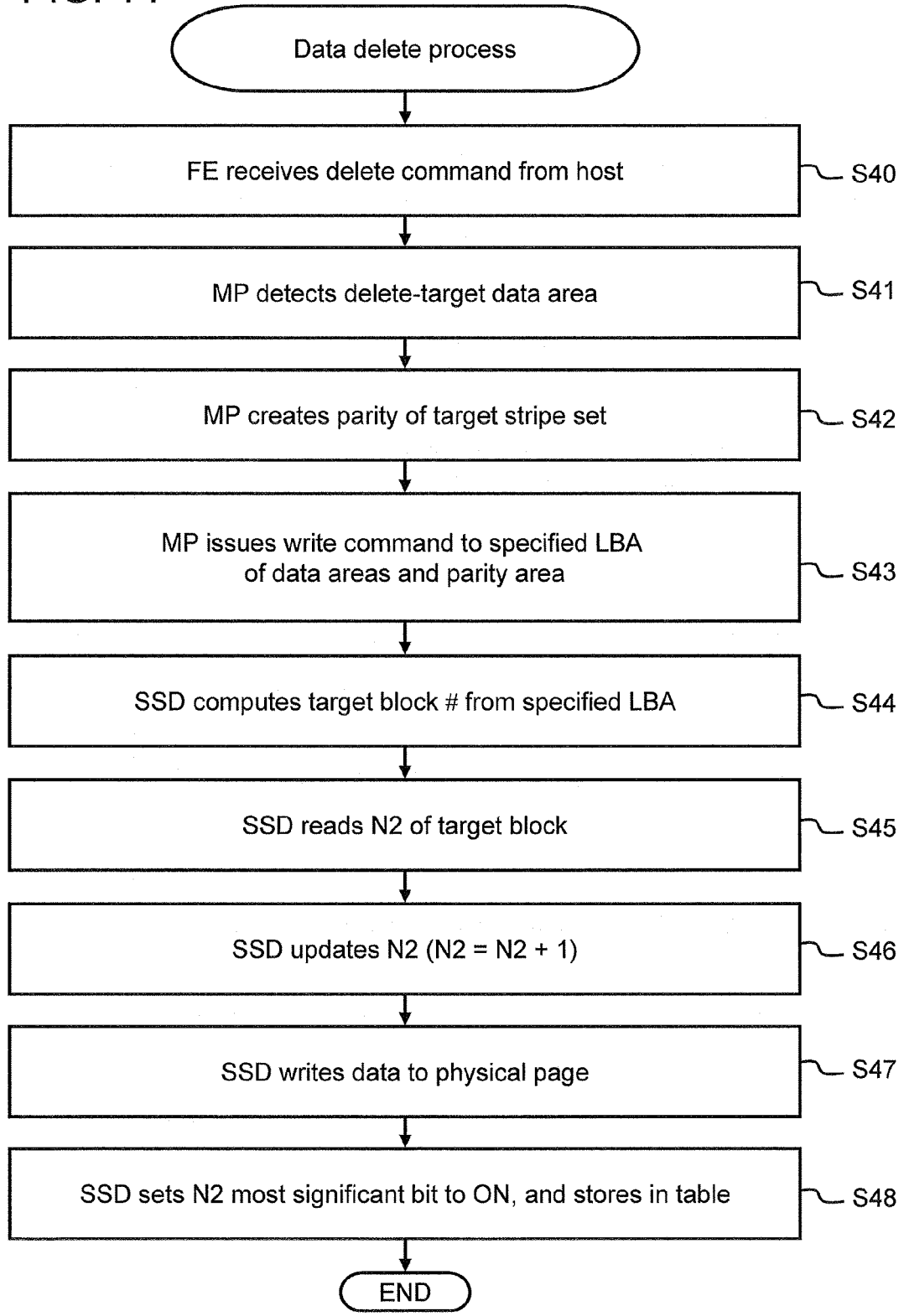
FIG. 14 is a flowchart showing a data erase process.

FIG. 14 is a flowchart showing a data erase process. The FE package 110 receives a data erase command (for example, a SCSI WRITE SAME command) from the host 20 (S40).

The MP package 140 detects the erase-target data area (S41), and computes the parity of the target stripe set (S42). The MP package 140 specifies a LBA and issues a write command for the respective data areas and one parity area included in the target stripe set (S43).

The SSD controller 211 computes the number of the target block based on the LBA specified by the MP package 140 (S44). The SSD controller 211 reads the value of the "current number of writes N2" with respect to the target block from the number of writes management table T20 (S45).

The SSD controller 211 increments by 1 the value of the current number of writes N2 (S46). The SSD controller 211 writes the data for the data erase (for example, the NULL data) to the physical page corresponding to the target block (S47).

The SSD controller 211 sets the most significant bit in the current number of writes N2 to the OFF state, and stores the current number of writes N2 in the table T20 (S48). A block 2121 for which the most significant bit has been set to the ON state is treated as a block in which data has not been written.

Figure 15:
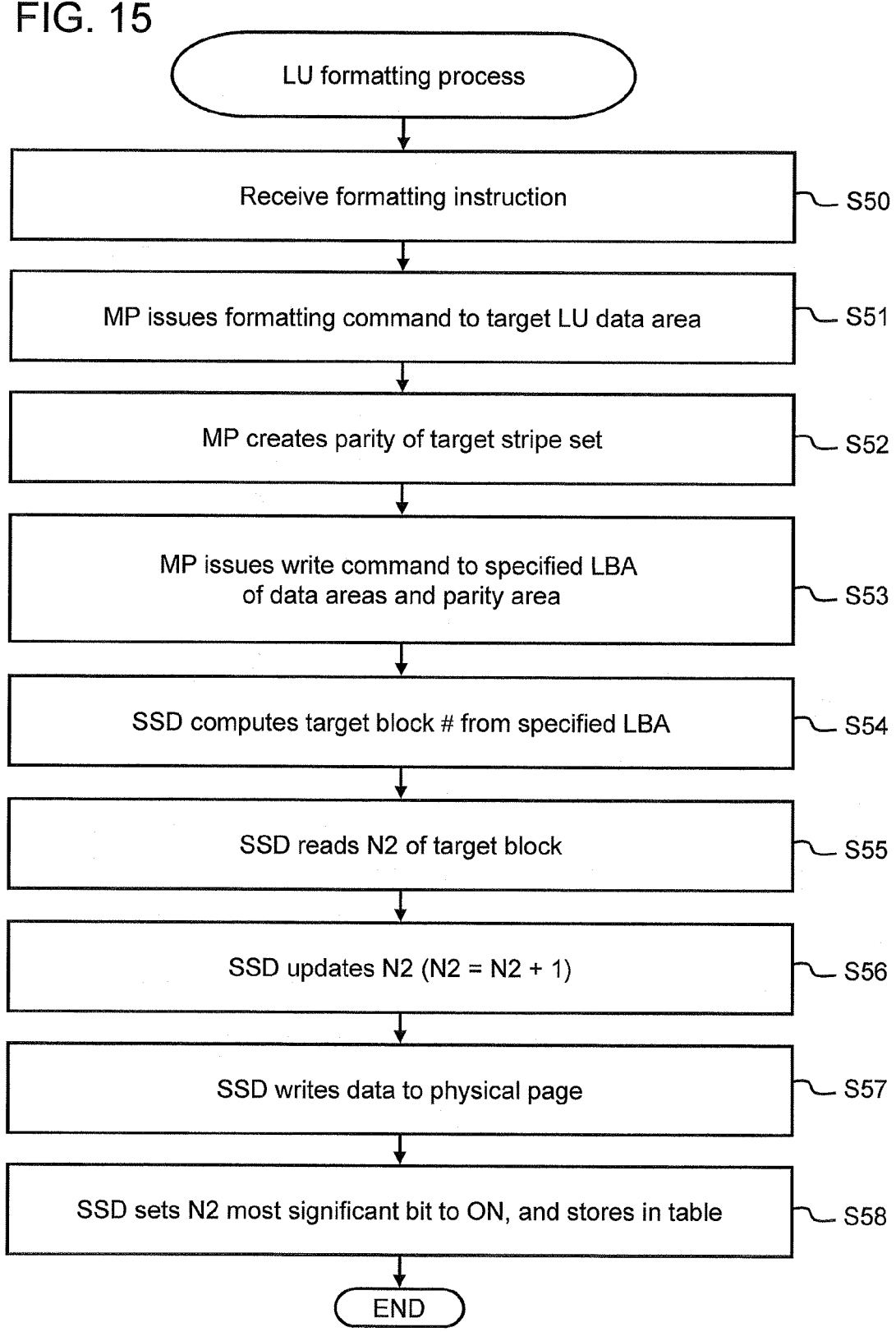
FIG. 15 is a flowchart showing a process for formatting a logical volume.

FIG. 15 is a flowchart showing a process for formatting the logical volume (LU). The controller 100 receives a formatting instruction from the user (S50). For example, the user can request the formatting of a specified logical volume 240 by way of either the maintenance terminal 30 or the host 20.

The MP package 140, upon receiving the formatting instruction, issues a formatting command to the formatting-target logical volume 240 (S51). The subsequent processing is the same as the data erase process described using FIG. 14. Since S52 through S58 are the same as S42 through S48, explanations thereof will be omitted.

Figure 16:
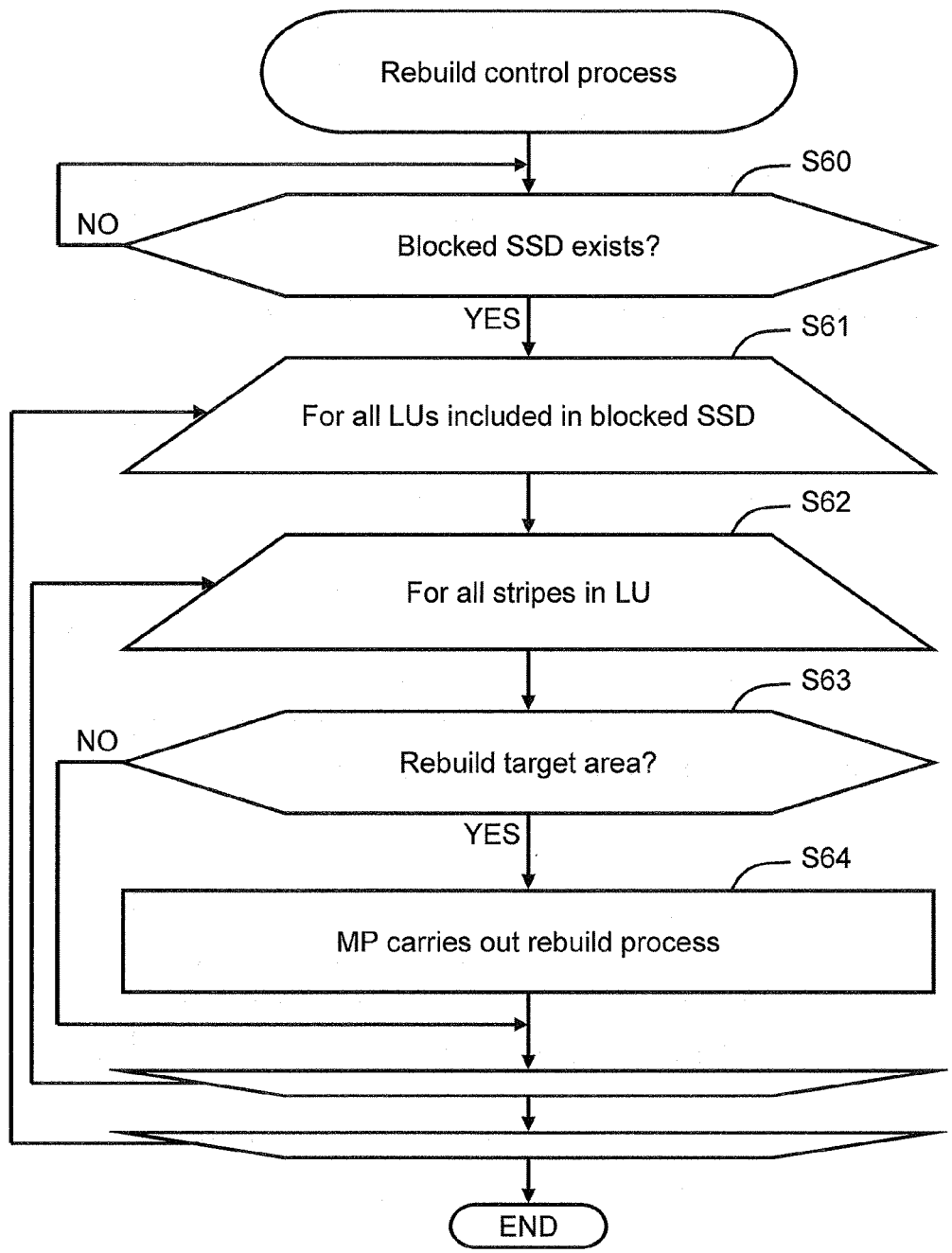
FIG. 16 is a flowchart showing a process for controlling the rebuild process.

FIG. 16 is a flowchart showing a rebuild control process. The MP package 140 determines whether a storage device 210 for which a blocking process was carried out exists (S60). Although omitted from the flowchart, the MP package 140 blocks a storage device 210 in which a failure has been detected. However, the MP package 140 carries out the blocking process in a case where a pre-set prescribed failure has occurred, but does not carry out the blocking process for a minor failure.

The MP package 140 executes the following steps with respect to all the logical volumes 240 included in a blocked storage device 210 (S61). The logical volume that becomes the target of the following processing from among the logical volumes related to the blocked storage device 210 will be called the target volume. In the drawing, the logical volume is abbreviated as LU.

The MP package 140 executes the following steps S63 and S64 for all the stripe sets inside the target volume (S62). A processing-target stripe set will be called the target stripe set.

First, the MP package 140 determines whether the target stripe set is a rebuild-target area (S63). This determination process will be explained in detail further below.

In a case where the target stripe set is a rebuild-target area, the MP package 140 executes the rebuild process (S64). As was explained hereinabove, the data stored in the blocked storage device 210 is restored based on the data stored in the data areas and/or parity area of the stripe set. The restored data (recovered data) is stored in a prescribed location inside a spare storage device 210.

Figure 17:
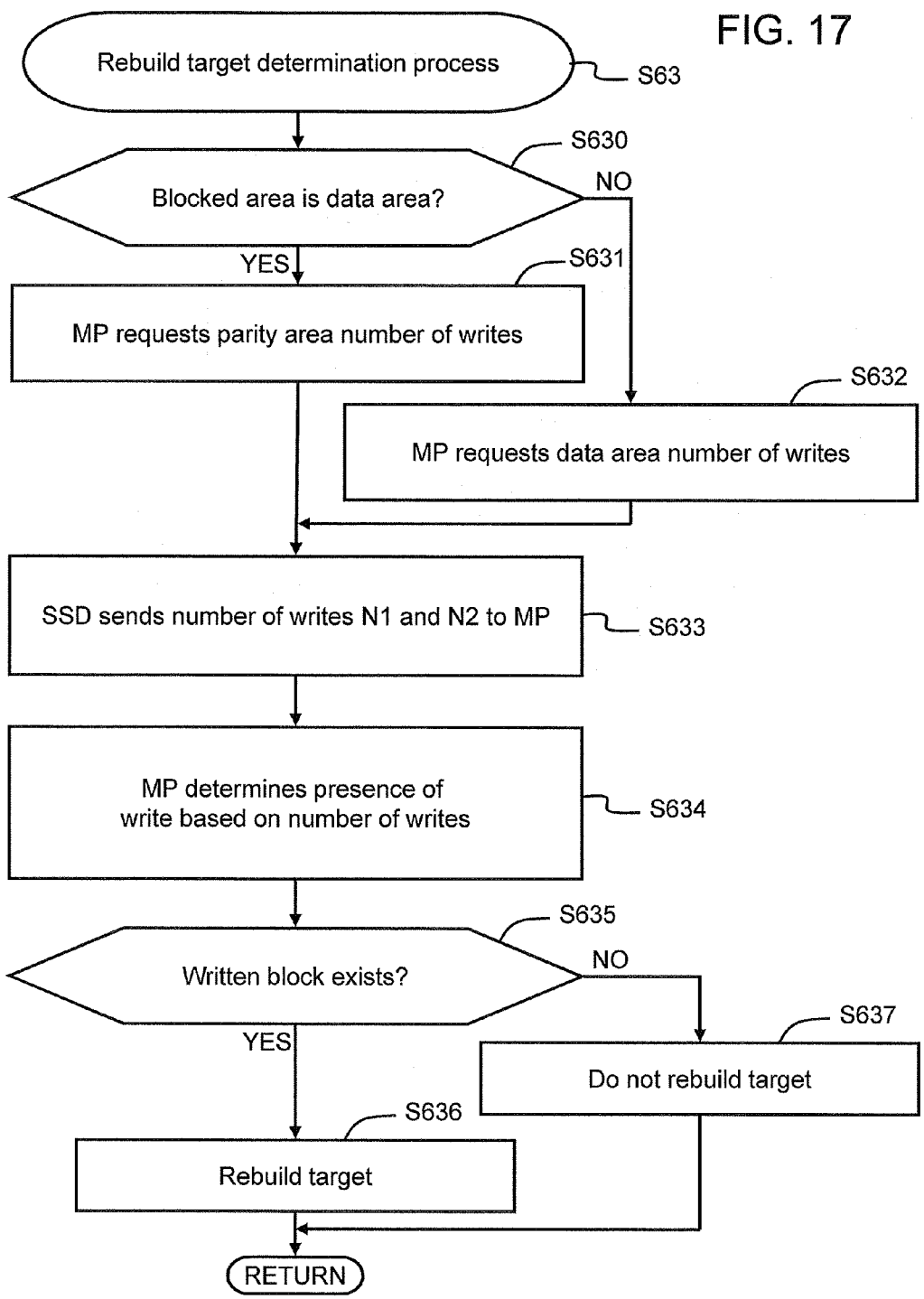
FIG. 17 is a flowchart showing a process for determining an area to be the target of the rebuild process.

FIG. 17 is a flowchart showing the process for determining whether an area is a rebuild target. The flowchart of FIG. 17 shows the details of S63 of FIG. 16.

The MP package 140 determines the type of the blocked area included in the target stripe set (S630). The blocked area is a block of the blocked storage device 210. The MP package 140 determines whether the blocked area is a data area (S630).

In a case where the blocked area is a data area (S630: YES), the MP package 140 requests the numbers of data writes N1 and N2 of the parity area included in the target stripe set from the SSD controller 211 (S631).

This is because, as was described using the first stripe set of FIG. 12, in a case where the blocked area is a data area, a determination can be made as to whether the data inside the blocked area has been updated by simply checking whether or not the value of the parity area corresponding to this data area has been updated.

Alternatively, in a case where the blocked area is not a data area (S630: NO), the blocked area is a parity area. In a case where the blocked area is a parity area, the MP package 140 requests the numbers of data writes N1 and N2 of each data area included in the target stripe set from the SSD controller 211. (S632).

This is because, as was described using the fourth stripe set of FIG. 12, in a case where the blocked area is a parity area, a determination that the parity was updated can be made when any one of the multiple data areas corresponding to this parity area has been updated.

The SSD controller 211 reads the numbers of data writes N1 and N2 requested by the MP package 140 in either S631 or S632 from the table T20, the sends these N1 and N2 to the MP package 140 (S633).

The MP package 140 determines whether or not data is written to this block based on the numbers of data writes N1 and N2 (S634). The process for determining whether or not data is written will be explained further below using FIG. 18.

The MP package 140 determines whether any one of the processing-target blocks is a block in which data is written (S635).

More specifically, in a case where the blocked area is a data area, the MP package 140 only acquires the numbers of data writes N1 and N2 of the parity area. The MP package 140 does not need to acquire the numbers of data writes N1 and N2 from the other data areas in this target stripe set. Therefore, in S635, the MP package 140 determines whether or not the data in the parity area has been updated (S635).

Alternatively, in a case where the blocked area is a parity area, the MP package 140 acquires the numbers of data writes N1 and N2 with respect to each data area included in the target stripe set. The MP package 140 determines whether even one of the blocks of the respective data areas is a block in which data is written (S635).

In a case where there is one or more blocks in which data is written (S635: YES), the MP package 140 regards the blocked area as a rebuild process target (S636), and returns to the flowchart shown in FIG. 16.

Alternatively, in a case where there is not even one block in which data is written (S635: NO), the MP package 140 does not regard the blocked area as a rebuild process target (S637), and returns to the flowchart shown in FIG. 16.

Figure 18:
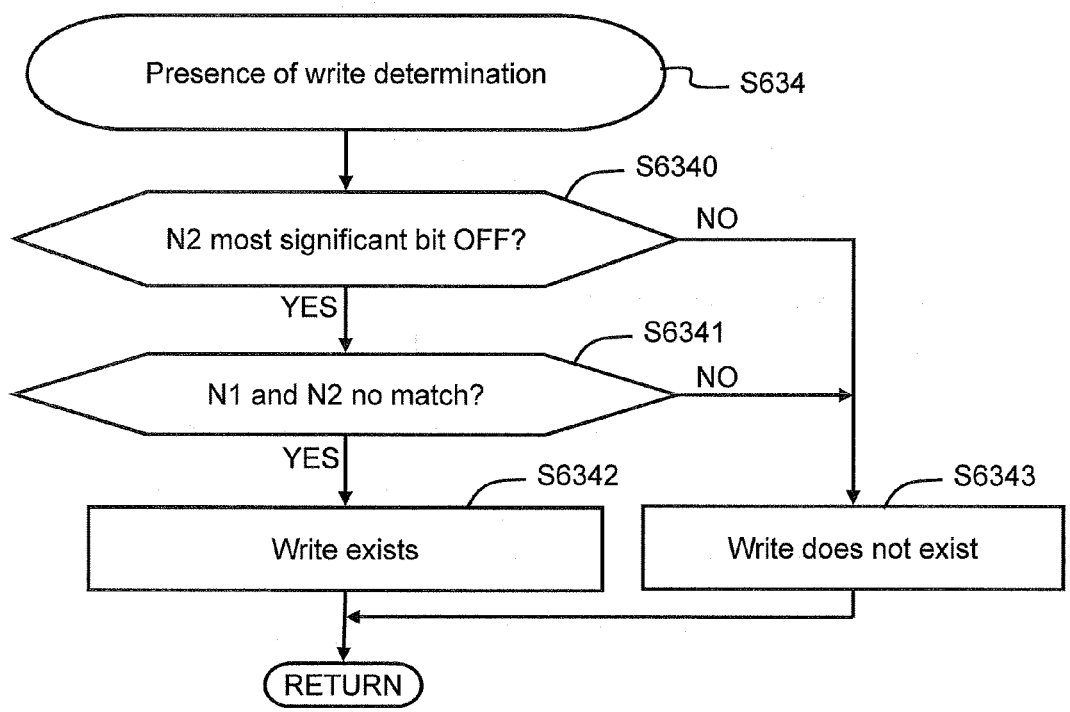
FIG. 18 is a flowchart showing a process for determining whether data has been written.

FIG. 18 shows the process for determining whether or not data is written in an area. This processing shows the details of S634 in FIG. 17.

The MP package 140 determines whether the most significant bit of the current number of data writes N2 is in the OFF state (S6340). That is, the MP package 140 checks whether a 0 is set in the most significant bit of the current number of data writes N2. The most significant bit of the current number of data writes N2 of a certain block being in the OFF state signifies that the data of this block has not been erased in accordance with a command.

In a case where the most significant bit of the current number of data writes N2 is in the OFF state (S6340: YES), the MP package 140 determines whether the number of data writes at production N1 and the current number of data writes N2 are a mismatch (S6341).

In a case where the number of data writes at production N1 and the current number of data writes N2 are a mismatch (S6341: YES), the MP package 140 determines that data is written in this block (S6342).

In a case where the most significant bit of the current number of data writes N2 is in the ON state (S6340: NO), the MP package 140 determines that data is not written in this block (S6343). This is because in a case where the data erase command has been issued, the most significant bit of the current number of data writes N2 is changed to the ON state.

In a case where the number of data writes at production N1 and the current number of data writes N2 are a match (S6341: YES), the MP package 140 also determines that data is not written in this block (S6343). This is because in a case where data is written in a block, the value of the current number of data writes N2 increases, and the current number of data writes N2 no longer matches the number of data writes at production N1.

Configuring this example in this way achieves the following effects. In this example, a determination is made as to whether or not there is an area that requires rebuild processing with respect to all the stripe sets in all the logical volumes 240 related to the blocked storage device 210. In this example, the rebuild process is executed with respect to an area determined to be in need of a rebuild process. The rebuild process is not executed for an area for which the determination is that there is no need for a rebuild process.

Therefore, this example is able to reduce the amount of rebuild processing compared to a case in which rebuild processing is carried out for all the storage areas of a blocked storage device. This makes it possible to lessen the processing load on the storage control apparatus 10 and to curb a drop in response performance.

In this example, the acquisition range for the numbers of data writes N1 and N2 is controlled in accordance with whether the target area is a data area or a parity area. In this example, in a case where the blocked area is a data area, only the numbers of writes N1 and N2 of the parity area belonging to the same stripe set as the blocked area are acquired. In a case where the blocked area is a parity area, both the numbers of writes N1 and N2 are acquired for each data area belonging to the same stripe set as the blocked area. Therefore, the presence of data can be efficiently determined by acquiring the numbers of data writes N1 and N2 in accordance with the required range.

In this example, the number of writes management table T20 is stored in the memory 2113 inside the storage device 210. Therefore, in this example, the number of writes management table T20 of each storage device 210 does not need to be stored in the memory package 130 inside the controller 100, making it possible for the storage area of the memory package 130 to be used for processing a command from the host 20.

In this example, a determination is made as to whether or not data is written in an area by comparing the number of data writes at production N1 to the current number of data writes N2. In addition, in this example, the current number of data writes N2 is incremented by 1, and the most significant bit of the current number of data writes N2 is set to the ON state at the time of a data erase as was described in FIG. 14.

The life of an SSD storage device 210 is managed using either one or both of the number of data erases and the number of data writes. Therefore, the SSD must store management information related to either the number of data erases or the number of data writes.

This example determines the presence of data in an area by using the technical characteristics of the SSD by which the life of the SSD is managed using either the number of data erases or the number of data writes. This example is more effective in a case where the SSD life is managed based on the number of data writes. This is because a SSD must be equipped with a mechanism for managing the number of data writes. This example can be easily realized by expanding this mechanism.

In this example, information denoting that data has been erased is included in the current number of data writes N2. Therefore, in a case where an erase command has been issued, it is possible to clarify the block from which data was erased. This makes it possible in this example to simplify the configuration of the management information, to prevent the size of the management information from increasing, and to quickly determine the presence or absence of data.

Example 2

Example 2 will be explained by referring to FIG. 19. The following examples, to include this example, are equivalent to variations of Example 1. Therefore, the differences with Example 1 will mainly be explained below. In this example, the configuration in a case where the present invention is used in combination with thin provisioning technology will be explained.

Figure 19:
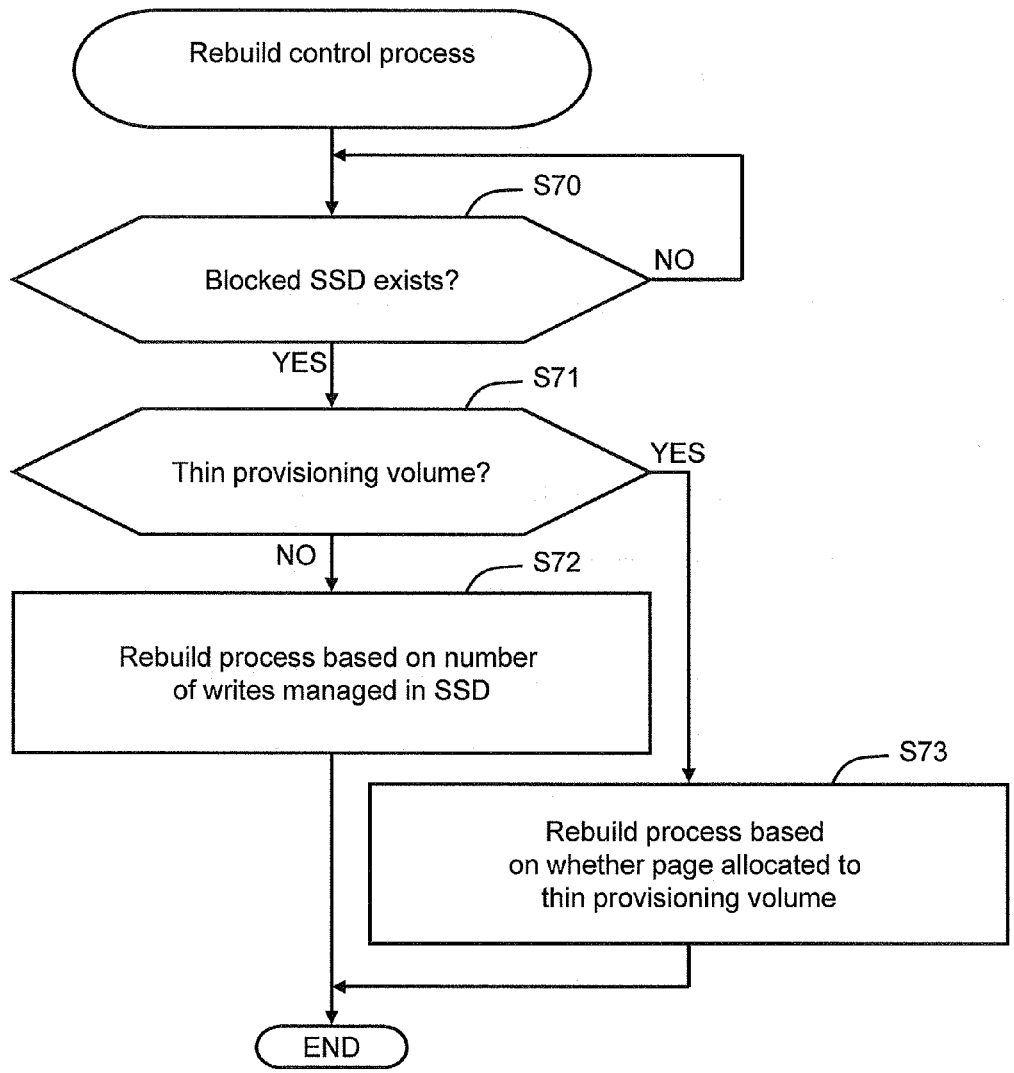
FIG. 19 is a flowchart showing a process for controlling the rebuild process related to Example 2.

FIG. 19 is a flowchart showing a rebuild control process in accordance with this example. The MP package 140 determines whether a blocked storage device 210 (SSD) exists (S70). When a blocked storage device 210 is detected (S70: YES), the MP package 140 determines whether the blocked storage device 210 is providing a storage area to a thin provisioning volume (S71).

In a case where the blocked storage device 210 is not providing a storage area to a thin provisioning volume (S71: NO), the MP package 140 determines whether or not there is a rebuild process target based on the numbers of data writes N1 and N2 for each stripe set as was described in Example 1 (S72). Since the details of this processing were described using FIG. 17, an explanation will be omitted here.

In a case where the blocked storage device 210 is providing a storage area to a thin provisioning volume (S71: YES), the MP package 140 determines whether or not there is a rebuild process target based on whether a page is allocated to the thin provisioning volume in the target stripe set (S73).

In a case where a page has been allocated to the thin provisioning volume in the target stripe set, data could be written in the blocked area, and as such, the blocked area becomes the target of the rebuild process. This is because in thin provisioning technology, a storage area is allocated to the thin provisioning volume in accordance with a write access from the host 20. Configuring this example like this also achieves the same effects as Example 1.

Example 3

Example 3 will be explained by referring to FIG. 20. In this example, the rebuild process is controlled in accordance with the type of blocked storage device 210.

Figure 20:
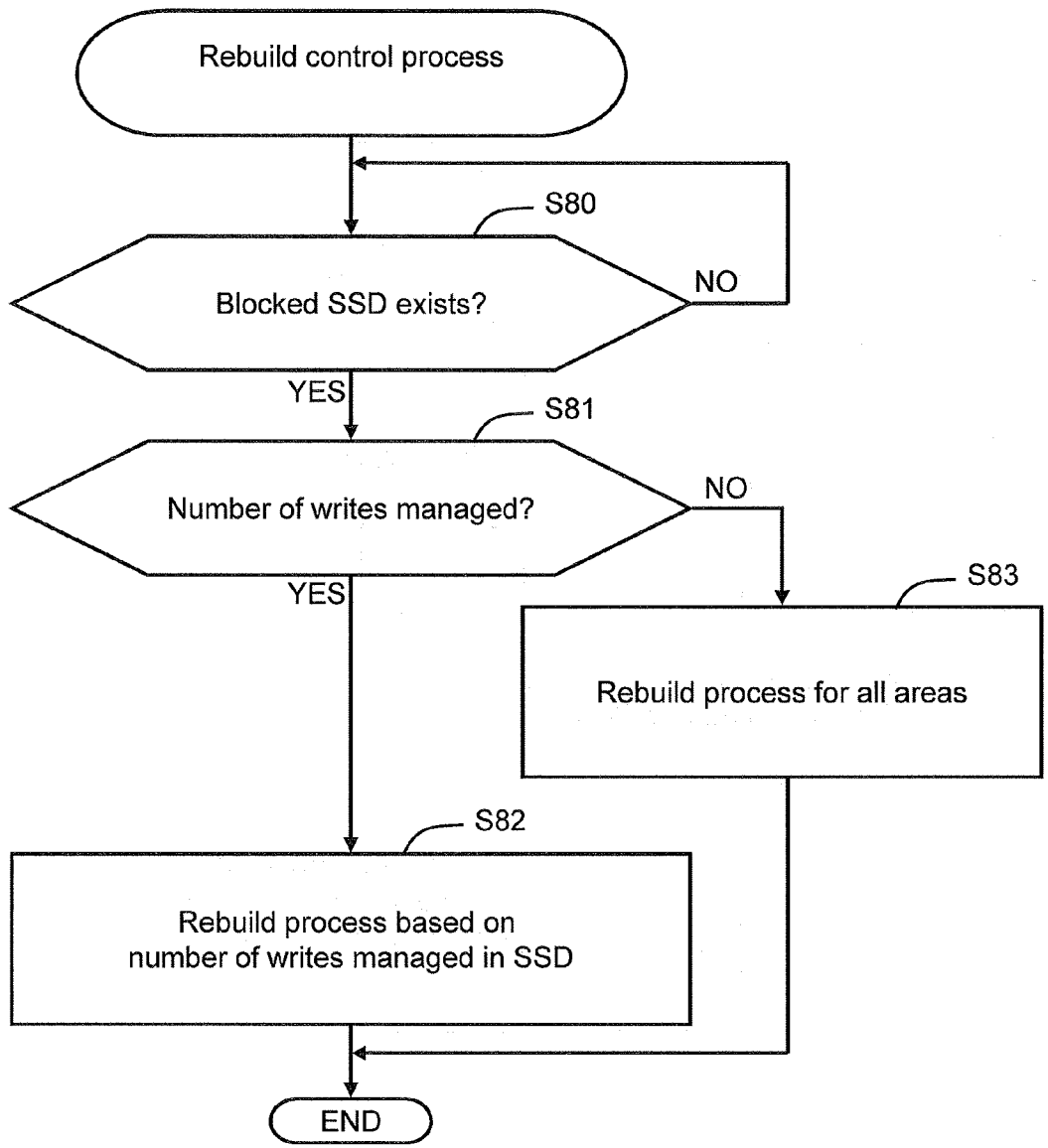
FIG. 20 is a flowchart showing a process for controlling the rebuild process related to Example 3.

FIG. 20 is a flowchart showing a rebuild control process of this example. The MP package 140 determines whether a blocked storage device 210 exists (S80). The MP package 140 determines whether or not the blocked storage device 210 is managing the number of data writes (S81). That is, the MP package 140 determines whether the number of data writes is being managed in each storage device 210 belonging to the same RAID group 230 as the blocked storage device 210 (S81).

In a case where the number of data writes is being managed (S81: YES), the MP package 140 controls the rebuild process for the blocked area based on the numbers of data writes N1 and N2 as was described in Example 1 (S82). Rebuild processing is carried out for a blocked area in which it has been determined that data is written, and rebuild processing is not carried out for a blocked area in which it has been determined that data is not written.

Alternatively, in a case where the blocked storage device 210 is not managing the number of data writes (S81: NO), the MP package 140 executes the rebuild process with respect to all the blocked areas (S83). For example, in a case where the blocked storage device 210 is either a hard disk drive, or a flash memory device that is not storing the number of writes management table T20, a normal rebuild process is executed.

In a case where information denoting whether or not the storage device 210 is storing the number of writes management table T20 is managed in accordance with the RAID group management table T13 shown in FIG. 9, the MP package 140 can easily carryout the determination of Step S81. For example, a flag column denoting the presence or absence of the management table is added to the RAID group management table T13. In a case where the storage device 210 comprises the number of writes management table T20, a 1 is set in the flag. In a case where the storage device 210 does not comprise the number of writes management table T20, a 0 is set in the flag.

Configuring this example like this achieves the same effects as Example 1. In addition, in this example, in a case where the storage device 210 is storing the number of writes management table T20, the rebuild process is controlled as was described in Example 1. Therefore, in this example, the rebuild process can be appropriately controlled in accordance with the type of storage device.

Example 4

Example 4 will be explained by referring to FIGS. 21 through 25. In this example, management information denoting whether or not data is written in each storage device 210 is integratively managed inside the controller 100.

Figure 21:
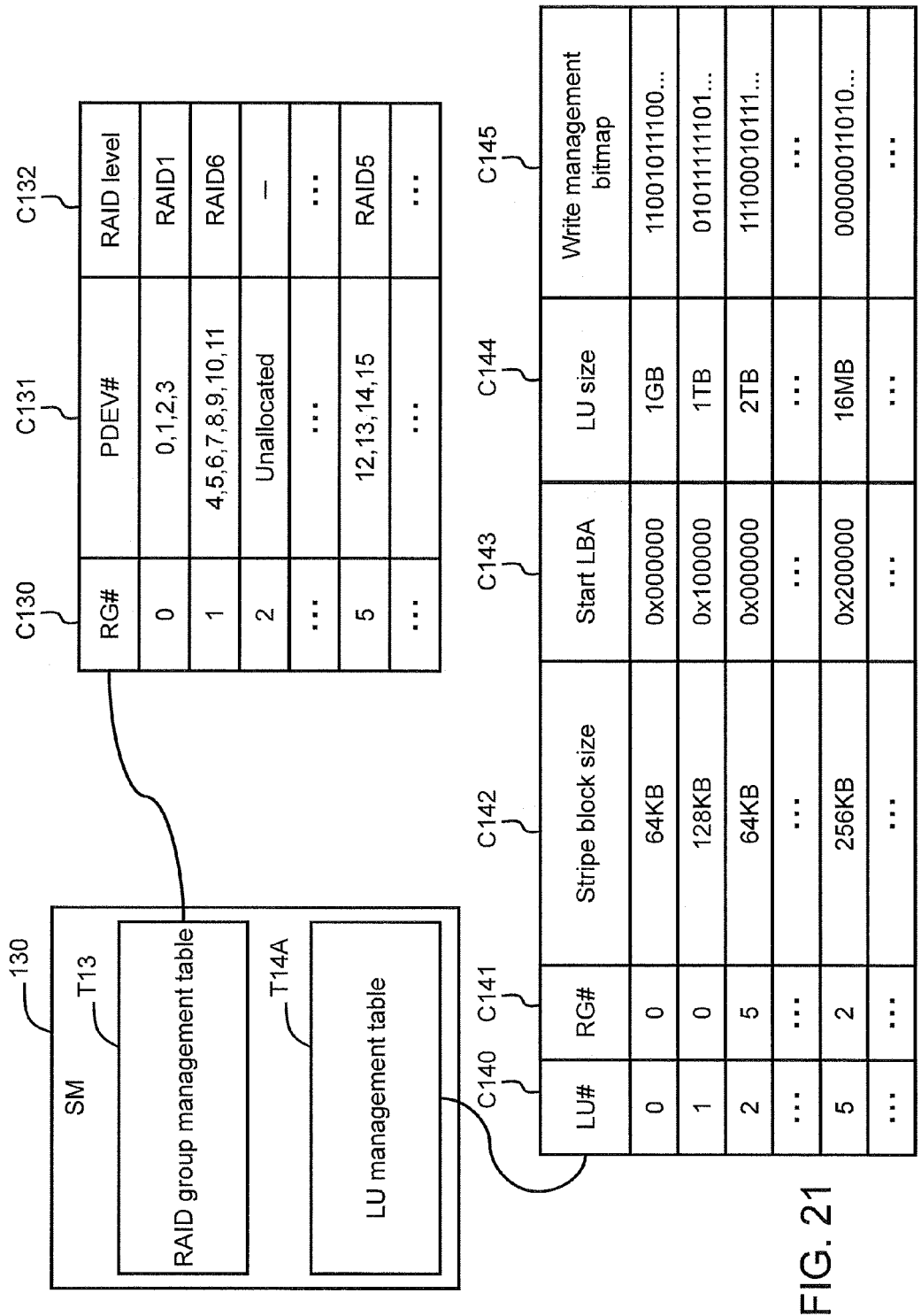
FIG. 21 is an illustration showing a RAID group management table and a logical volume management table related to Example 4.

FIG. 21 shows a logical volume management table T14A of this example. Compared to the logical volume management table T14 shown in FIG. 9, the logical volume management table T14A comprises a bitmap C145 for managing the number of writes.

The bitmap C145 is management information for managing whether or not data is written in each of the stripe sets. One bit is allocated for one stripe set. A 1 is set in a stripe set in which data is written. A 0 is set in a stripe set in which data is not written or a stripe set in which data has been erased.

The presence or absence of a data write is managed in units of stripe sets rather than units of stripe blocks. The rebuild process may be managed in stripe set units since this processing is carried out for each stripe set. This makes it possible to reduce the size of the bitmap C145.

In this example, since the presence or absence of a data write to each storage device 210 is integratively managed inside the controller 100, there is no need for the respective storage devices 210 to stores the number of writes management table T20. In this example, the storage device 210 does not have to be a SSD, but the following explanation explains a case in which the storage device 210 is a SSD.

Figure 22:
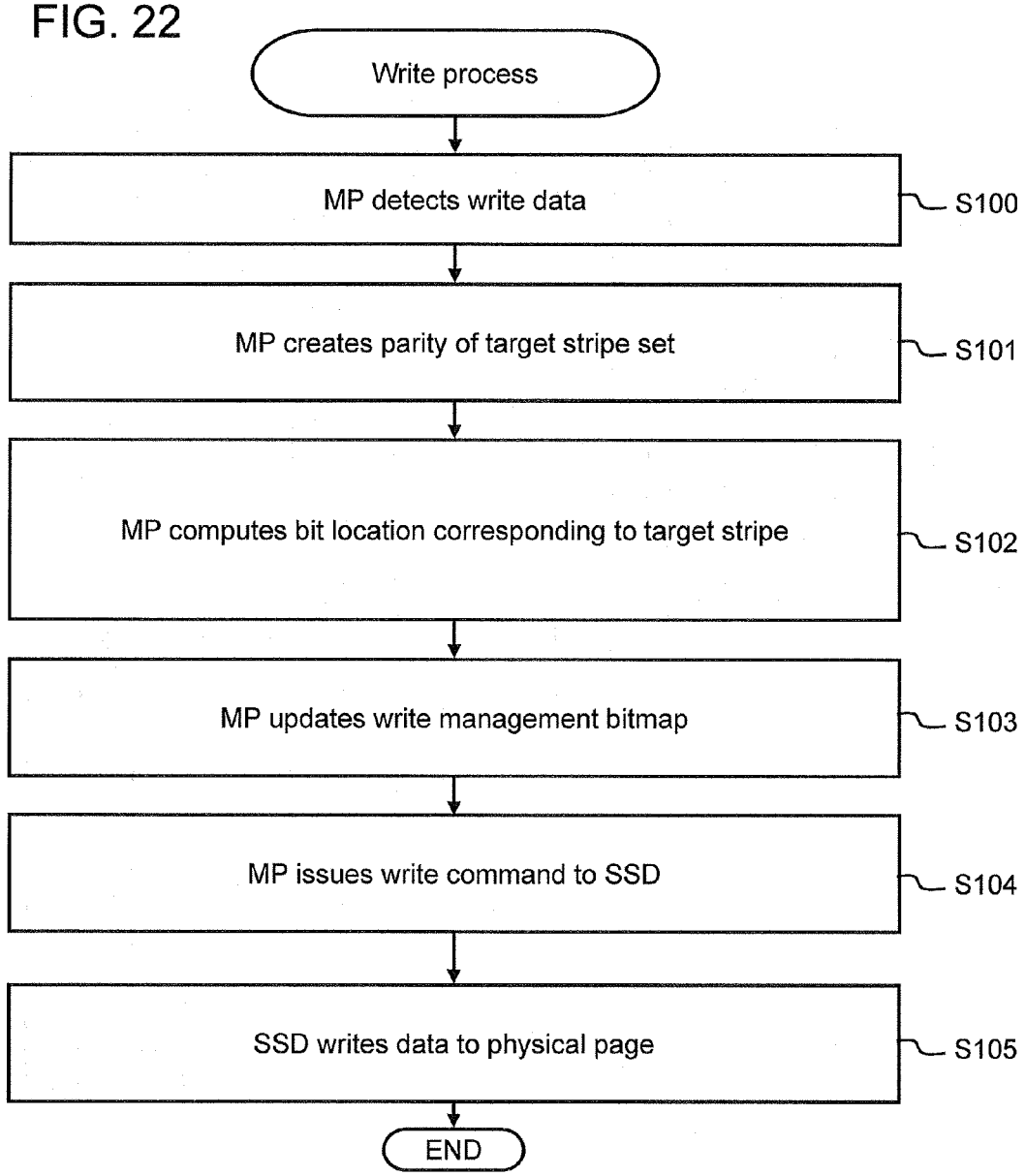
FIG. 22 is a flowchart showing a write process.

FIG. 22 is a flowchart showing a write process. The MP package 140, upon detecting write data received from the host 20 (S100), computes the parity of the target stripe set written in the storage device 210 (S101). The MP package 140 detects the bit location of the target stripe set (S102), and updates the write management bitmap C145 so that the value of this bit location becomes 1 (S103).

The MP package 140 specifies a LBA and issues a write command for the respective data areas and one parity area included in the target stripe set (S104). The SSD controller 211 writes the write data received from the MP package 140 to the physical page (S105).

Figure 23:
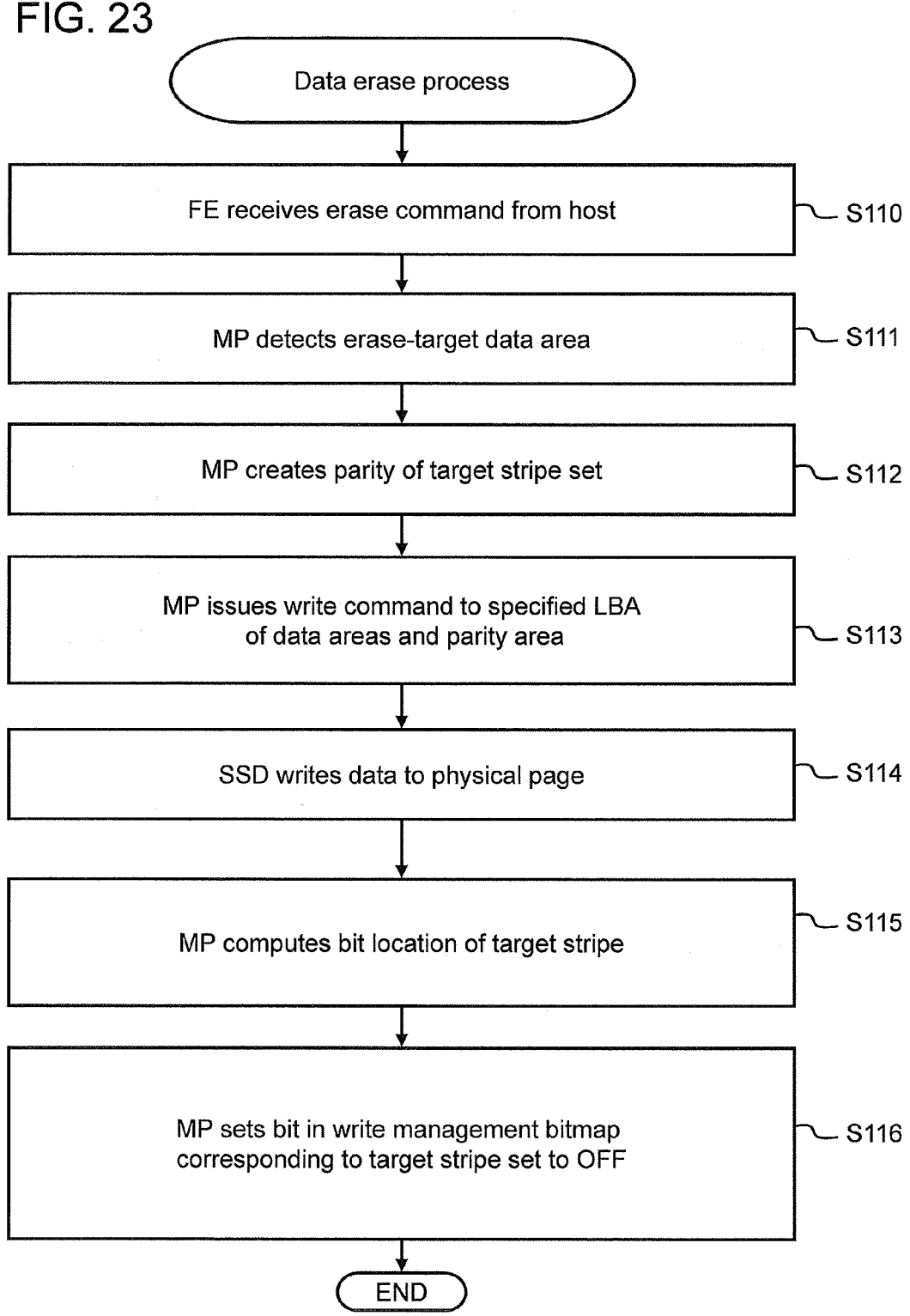
FIG. 23 is a flowchart showing a data erase process.

FIG. 23 is a flowchart showing a data erase process. The FE package 110 receives a data erase command from the host 20 (S110).

The MP package 140 detects the erase-target data area (S111), and computes the parity of the target stripe set (S112). The MP package 140 specifies a LBA and issues a write command for the respective data areas and one parity area included in the target stripe set (S113). The SSD controller 211 writes the write data to the physical page (S114).

The MP package 140 detects the bit location of the target stripe set (S115), and updates the write management bitmap C145 so that the value of this bit location becomes 0 (S116).

Figure 24:
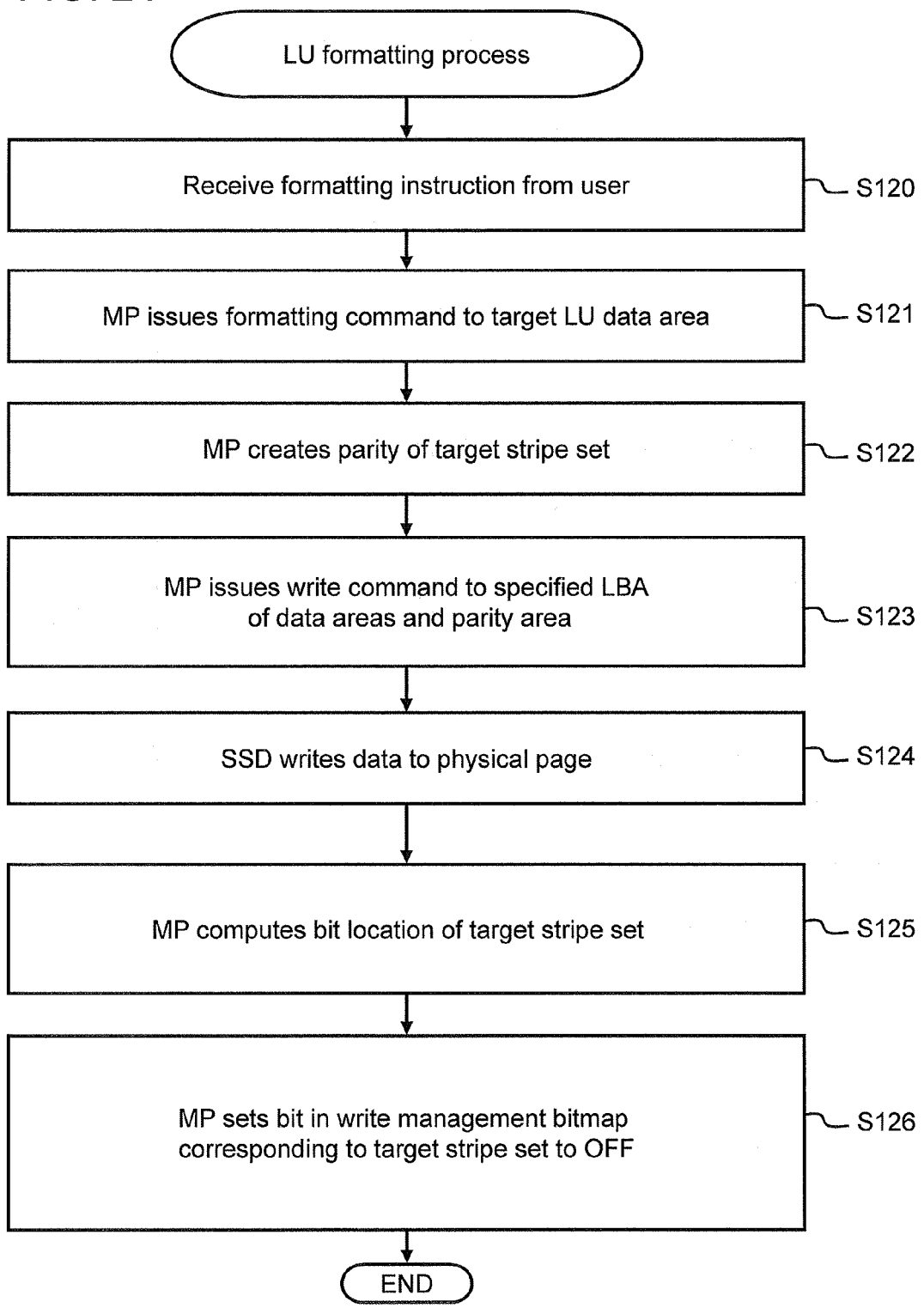
FIG. 24 is a flowchart showing a process for formatting a logical volume.

FIG. 24 shows the process for formatting the logical volume 240. The controller 100 receives a formatting instruction from the user (S120). The MP package 140, upon receiving the formatting instruction, issues a formatting command to the formatting-target logical volume 240 (S121).

The subsequent processing is the same as the data erase process described using FIG. 23. Since S122 through S126 are the same as S112 through S116, explanations thereof will be omitted.

Figure 25:
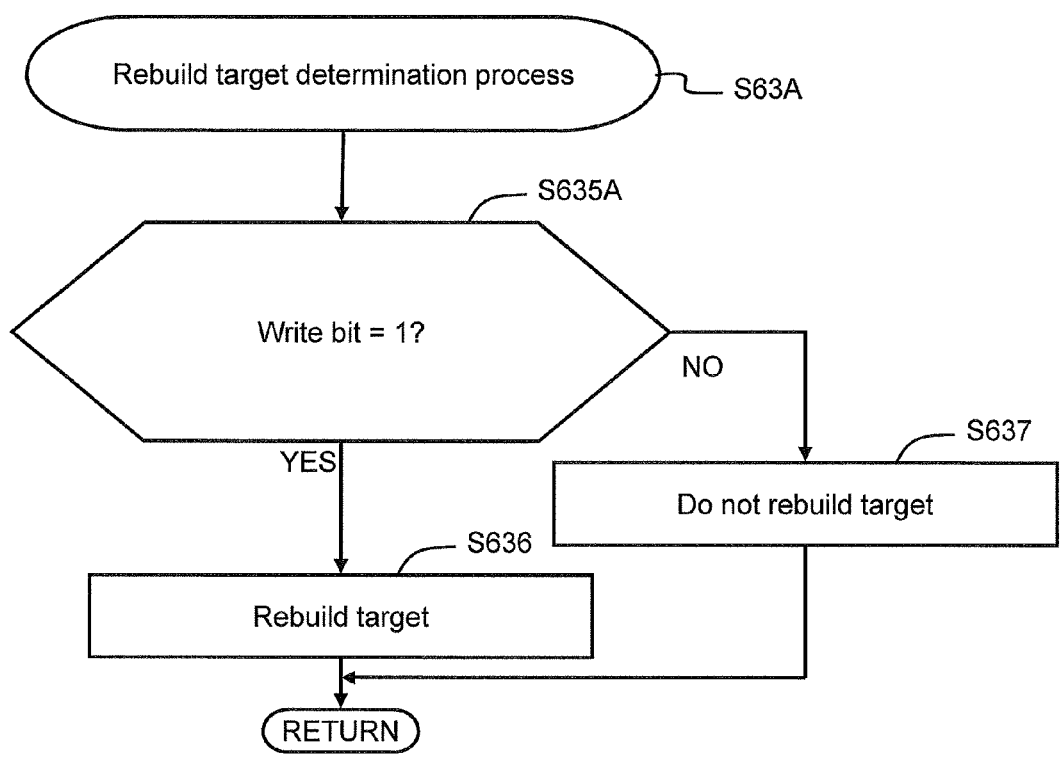
FIG. 25 is a flowchart showing a process for determining an area to be the target of the rebuild process.

FIG. 25 is a flowchart showing a rebuild control process S63A of this example. The MP package 140 refers to the write management bitmap C145, and determines whether the bit corresponding to the target stripe set is set to 1 (S635A).

The MP package 140 regards the target stripe set for which the bit is set to 1 as the target for a rebuild process (S636). The MP package 140 does not regard the target stripe set for which the bit is set to 0 as the target for a rebuild process (S637).

Configuring this example like this also makes it possible to reduce the amount of rebuild processing and to efficiently carry out a rebuild process.

Furthermore, needless to say, the present invention is not limited to the respective examples described hereinabove and various changes are possible without departing from the gist thereof. For example, in Example 1, the storage device is not limited to a flash memory device (SSD), but rather may be any storage device that manages the number of writes. Also, for example, instead of a configuration for managing the presence or absence of data in block units, the configuration may be such that the presence or absence of data is managed in units of multiple blocks, in units of physical pages, or in units of virtual blocks inside a page. However, the smaller the size to be managed becomes, the more the size of the management information increases.

REFERENCE SIGNS LIST 1, 10 Storage control apparatus
3, 210 Storage device
6, T20, C145 Data write management information

The invention claimed is:

1. A storage control apparatus used by a higher-level apparatus, comprising:
a controller, and multiple storage devices controlled by this controller, wherein
the multiple storage devices configure a parity group, which enables data restoration by parity,
the storage control apparatus further comprising:
a blocking process part for blocking a prescribed storage device from among the multiple storage devices;
a management information storage part for storing management information for managing, for each of the storage devices, a prescribed area having data from a higher-level apparatus from among the storage areas of the storage devices that are provided in the respective multiple storage devices and at a provided destination;
a determination part for determining whether a storage area of the prescribed storage device is a data area or a parity area for each stripe line of the parity group;
if it is determined that the storage area is a data area, obtaining management information for a parity area corresponding to the data area from the management information storage part, and determining whether the data area is the prescribed area based on the management information for the parity area and a prescribed determination criterion;
if it is determined that the storage area is a parity area, obtaining management information for the data area corresponding to the parity area from the management information storage part, and determining whether the parity area is the prescribed area based on the management information for the data area and a prescribed determination criterion; and
a rebuild control part for executing a rebuild process with respect to an area determined to be the prescribed area from among the storage areas of the prescribed storage device.

2. A storage control apparatus according to claim 1, wherein
the management information, which is managed by the management information storage part, manages, for each area of a prescribed size, a storage area of the storage device, with a first value denoting the number of data writes at production being associated with a second value denoting the current number of data writes, and
based on the prescribed determination criterion, a determination is made that an area for which the first value and the second value do not match is the prescribed area.

3. A storage control apparatus according to claim 2, wherein
the management information further manages, in association with the second value, a third value for denoting whether or not data of the prescribed size area has been erased, and
based on the prescribed determination criterion, in a case where the third value does not denote a data erase, a determination is made that an area for which the first value and the second value do not match is the prescribed area.

4. A storage control apparatus according to claim 3, wherein
the third value is configured as a most significant bit of the second value,
in a case where data in the prescribed size area has been erased, the most significant bit is set to ON, and
in a case where data is written in the prescribed size area, the most significant bit is set to OFF.

5. A method for controlling a storage control apparatus used by a higher-level apparatus, wherein
the storage control apparatus has a controller, and multiple storage devices controlled by the controller,
the multiple storage devices configure a parity group, which enables data restoration by parity, and
the multiple storage devices further store management information, which denotes whether there is a prescribed area that stores data written from the higher-level apparatus, for each of multiple second areas, which configure a first storage area of the respective storage devices, and wherein
the controller carries out:
a failure detection step of detecting whether a storage device in which a failure has occurred exists among the multiple storage devices;
a blocking step of blocking a failed storage device from among the multiple storage devices in a case where a storage device in which the failure has occurred is detected;
a determination step of determining whether a first storage area of the blocked storage device for each of the second areas is a data area or a parity area for each stripe line of the parity group;
wherein, if it is determined that the first storage area is a data area, a step of obtaining management information for a parity area corresponding to the data area from the management information, and determining whether the data area is the prescribed area based on the management information for the parity area and a prescribed determination criterion, which is stored in each of other multiple storage devices belonging to the same parity groups as the parity group to which the blocked storage device belongs;
wherein, if it is determined that the first storage area is a parity area, a step of obtaining management information for a data area corresponding to the parity area from the management information, and determining whether the parity area is the prescribed area based on the management information for the data area and a prescribed determination criterion; and
a restoration step of restoring, with respect to a second area determined to be the prescribed area, data stored in this second area, in accordance with a logical operation based on data stored in other multiple storage devices.

6. A storage control apparatus control method according to claim 5, wherein
the management information correspondingly manages, for each of the second areas, a first storage area of the storage device, with a first value denoting the number of data writes at production being associated with a second value denoting the current number of data writes.

7. A storage control apparatus control method according to claim 6, wherein, based on the prescribed determination criterion, a determination is made that an area for which the first value and the second value do not match is the prescribed area.

8. A storage control apparatus control method according to claim 7, wherein
the management information further manages, in association with the second value, a third value for denoting whether or not data of the second area has been erased, and
based on the prescribed determination criterion, in a case where the third value does not denote a data erase, a determination is made that an area for which the first value and the second value do not match is the prescribed area.

* * * * *